(12) United States Patent
Wagner

(10) Patent No.: US 8,229,204 B2
(45) Date of Patent: Jul. 24, 2012

(54) OPTICAL PROCESSING OF SURFACES TO DETERMINE CLEANLINESS

(75) Inventor: Christopher C. Wagner, St. Paul, MN (US)

(73) Assignee: Ecolab Inc., St. Paul, MN (US)

( * ) Notice: Subject to any disclaimer, the term of this patent is extended or adjusted under 35 U.S.C. 154(b) by 300 days.

(21) Appl. No.: 12/628,478

(22) Filed: Dec. 1, 2009

(65) Prior Publication Data

US 2010/0328476 A1    Dec. 30, 2010

Related U.S. Application Data

(63) Continuation of application No. 12/493,730, filed on Jun. 29, 2009, now abandoned.

(51) Int. Cl.
*G06K 9/00* (2006.01)

(52) U.S. Cl. ......................................... 382/141

(58) Field of Classification Search .................. 382/108, 382/141
See application file for complete search history.

(56) References Cited

U.S. PATENT DOCUMENTS

| | | | |
|---|---|---|---|
| 4,084,237 A | 4/1978 | Beachem et al. | |
| 4,104,542 A | 8/1978 | Karklys et al. | |
| 4,193,692 A | 3/1980 | Wynn | |
| 4,715,392 A * | 12/1987 | Abe et al. ........................ | 134/62 |
| 5,131,419 A | 7/1992 | Roberts | |
| 5,241,975 A | 9/1993 | Yanagihara | |
| 5,331,177 A | 7/1994 | Kubisiak et al. | |
| 5,383,482 A | 1/1995 | Yamada et al. | |
| 5,388,299 A | 2/1995 | Lee | |
| 5,411,042 A | 5/1995 | Suzuki et al. | |
| 5,545,259 A | 8/1996 | Suzuki et al. | |
| 5,631,733 A * | 5/1997 | Henley ........................ | 356/237.2 |
| 5,644,936 A | 7/1997 | Yasutake et al. | |
| 5,669,983 A | 9/1997 | Cooper et al. | |
| 5,715,555 A | 2/1998 | Reber et al. | |

(Continued)

FOREIGN PATENT DOCUMENTS

DE    35 16 006 C1    8/1992

(Continued)

OTHER PUBLICATIONS

Written Opinion of the International Searching Authority for counterpart application No. PCT/IB2010/052971, mailed Mar. 1, 2011, 7 pp.

(Continued)

*Primary Examiner* — Roy M Punnoose
(74) *Attorney, Agent, or Firm* — Shumaker & Sieffert, P.A.

(57) ABSTRACT

Techniques are described for determining cleanliness of various surfaces by processing images of the surfaces. The surfaces may comprise, for example, drinking glasses, dishes, fabric swatch arrays, Tosi plates, ceramic tiles, or stainless steel coupons. In one example, a system includes a camera to capture a digital image of a surface, a light source to illuminate the surface, a housing to enclose the surface, the camera, and the light source in a light-tight environment, and an analysis computer to receive the digital image, calculate a luminosity value for the surface from the digital image, and determine a cleanliness value for the surface from the calculated luminosity value. The analysis computer may automatically configure an environment in which to capture the digital image such that the environment is suited for the particular surface to be analyzed. The analysis computer may also cause the camera to automatically capture the digital image.

31 Claims, 11 Drawing Sheets

U.S. PATENT DOCUMENTS

| | | | |
|---|---|---|---|
| 5,743,209 | A | 4/1998 | Bazin et al. |
| 5,771,909 | A | 6/1998 | Hein et al. |
| 5,800,628 | A | 9/1998 | Erickson et al. |
| 5,818,063 | A | 10/1998 | Wilhelmstätter et al. |
| 5,831,730 | A | 11/1998 | Traina et al. |
| 5,886,648 | A | 3/1999 | McElroy et al. |
| 5,897,671 | A | 4/1999 | Newman et al. |
| 5,909,276 | A | 6/1999 | Kinney et al. |
| 5,923,432 | A | 7/1999 | Kral |
| 6,432,216 | B1 | 8/2002 | Thies |
| 6,463,940 | B1 | 10/2002 | Thomas et al. |
| 6,464,798 | B1 | 10/2002 | Rosenbauer et al. |
| 6,924,499 | B2 | 8/2005 | Poisel et al. |
| 7,162,896 | B2 | 1/2007 | Eiermann et al. |
| 7,175,715 | B2 | 2/2007 | Eiermann |
| 7,245,367 | B2 | 7/2007 | Miller et al. |
| 7,246,627 | B2 | 7/2007 | Jacobs et al. |
| 7,291,056 | B2 * | 11/2007 | Ohishi et al. ............ 451/5 |
| 7,663,502 | B2 * | 2/2010 | Breed ............ 340/12.25 |
| 2005/0046584 | A1 * | 3/2005 | Breed ............ 340/825.72 |
| 2007/0037484 | A1 * | 2/2007 | Ohishi et al. ............ 451/5 |
| 2007/0101885 | A1 | 5/2007 | Corrado et al. |
| 2008/0072393 | A1 * | 3/2008 | Tanaka ............ 15/250.03 |
| 2008/0151233 | A1 * | 6/2008 | Blanke et al. ............ 356/237.2 |

FOREIGN PATENT DOCUMENTS

| | | |
|---|---|---|
| DE | 10251872 B3 | 2/2004 |
| EP | 0 619 395 A1 | 12/1994 |
| EP | 2 022 384 A1 | 2/2009 |
| GB | 1 354 514 | 5/1974 |
| GB | 2 411 955 A | 9/2005 |
| JP | 63293446 A | 11/1988 |
| JP | 6148093 A | 5/1994 |
| JP | 11023478 A | 1/1999 |
| JP | 2001-041899 A | 2/2001 |
| JP | 2001292949 A | 10/2001 |
| JP | 2004261295 A | 9/2004 |
| JP | 2005095484 A | 4/2005 |
| JP | 2007-256273 A1 | 10/2007 |
| WO | WO/2006/011773 A1 | 2/2006 |

OTHER PUBLICATIONS

Wu, Ting-Fan, "Cafeteria Vision: Identification and Amount Measurement of Foods in a Plate", http://cseweb.ucsd.edu/classes/fa06/csc252c/projects/twu.pdf (Dec. 5, 2006) (10 pages).

* cited by examiner

OPTICAL PROCESSING OF SURFACES TO DETERMINE CLEANLINESS

CROSS REFERENCE TO RELATED APPLICATIONS

This application is a continuation of U.S. application Ser. No. 12/493,730, filed on Jun. 29, 2009, entitled, "OPTICAL PROCESSING OF SURFACES TO DETERMINE CLEANLINESS," which is incorporated herein by reference in its entirety.

TECHNICAL FIELD

This disclosure relates to optical processing systems.

BACKGROUND

Determining cleanliness of various items is important in many different industries. For example, developers of cleaning agents judge the effectiveness of a newly developed cleaning agent based on how clean a ware becomes after applying the cleaning agent. Restaurateurs determine cleanliness of dishes, glasses, cooking utensils, and eating utensils for sanitary and aesthetic purposes, e.g., to determine whether a particular ware is suitable for use or whether the ware must be re-washed after a first washing. Launderers may similarly determine whether laundry is clean for aesthetic purposes, e.g., to determine whether to re-wash a particular laundry item.

In many industries, a trained expert judges the cleanliness of an item via a visual inspection process and provides feedback as to the cleanliness of the item. In an attempt to quantify the meaning of the term "cleanliness," standardized cleanliness scales for different industries have been developed. In that case, an expert may provide a cleanliness rating as a numeric value on a standardized cleanliness scale. However, the use of experts requires reliance on subjectivity, as well as the time and expense to train a person to become an expert at determining cleanliness of a particular item.

SUMMARY

In general, this disclosure describes techniques for automatically determining cleanliness of surfaces, such as surfaces of wares. The wares may include, for example, dishes, glasses, stainless steel coupons, fabric swatches, Tosi plates, ceramic tiles, or other materials. The techniques include capturing a digital image of the surface being inspected, or a portion thereof, and analyzing the image to determine an average luminosity value for the surface. For certain types of wares, a higher luminosity value may be indicative of cleanliness, thus higher luminosity values indicate that the surface of the ware is relatively clean, whereas lower luminosity values indicate that the surface is relatively soiled. For other types of wares, a lower luminosity value may be indicative of cleanliness.

An inspection system for performing the techniques of this disclosure may include a light-tight housing, a camera within the housing to capture a digital image of the ware being inspected, and a processor or other control unit to process the captured digital image. The inspection system may provide an environment particularly tailored for the particular ware being inspected, which may include providing suitable lighting, camera settings (e.g., aperture and exposure time), and camera position relative to the ware. In this manner, the inspection system may produce an luminosity value according to controlled environmental settings. The inspection system may therefore avoid producing inaccurate luminosity values based on a change in environment, rather than based on cleanliness of the ware being inspected. In some examples, the inspection system may receive an identification of the ware to be inspected and the control unit may send one or more signals that automatically adjust the environment according to the received identification.

In one example, a method includes receiving, with a computing device, a digital image of a ware, calculating a luminosity value for the ware from the digital image, and determining, with the computing device, a cleanliness value for the ware from the calculated luminosity value.

In another example, a system includes a camera to capture a digital image of a ware, a light source to illuminate the ware, a housing to enclose the ware, the camera, and the light source in a light-tight environment, and an analysis computer to receive the digital image, calculate a luminosity value for the ware from the digital image, and determine a cleanliness value for the ware from the calculated luminosity value.

In another example, a computer-readable medium, such as a computer-readable storage medium, contains, e.g., is encoded with, instructions that cause a programmable processor to receive a digital image of a ware, calculate a luminosity value for the ware from the digital image, and determine a cleanliness value for the ware from the calculated luminosity value.

The details of one or more examples are set forth in the accompanying drawings and the description below. Other features, objects, and advantages will be apparent from the description and drawings, and from the claims.

DETAILED DESCRIPTION

Figure 1:
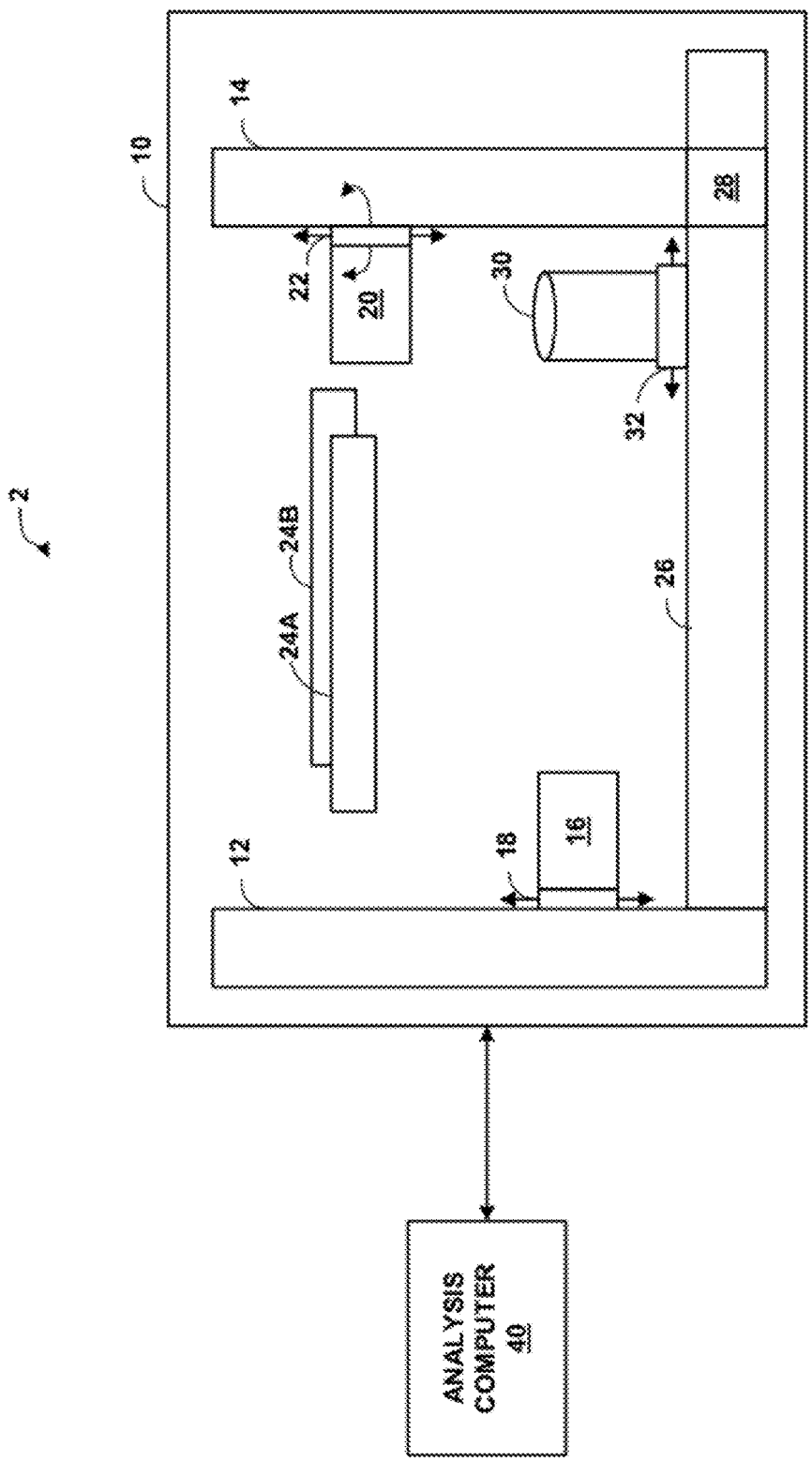
FIG. 1 is a block diagram illustrating an example system for determining cleanliness of various wares.

FIG. 1 is a block diagram illustrating an example system 2 that determines cleanliness or staining of various surfaces. Although generally described with respect to wares, it should be understood that the techniques of this disclosure are generally applicable to any type of surface. For ease of discussion, this disclosure primarily refers to inspection of wares, although it should be understood that the analysis techniques of this disclosure are applicable to digital images of surfaces of wares, and are not limited to the wares themselves. In the example of FIG. 1, system 2 includes camera 16, light emitting diode (LED) arrays 20, 24A, 24B, housing 10, and ware 30. In other examples, LED arrays 20, 24A, 24B may comprise other light sources, such as light bulbs, lasers, or other suitable devices for providing illumination. Ware 30 may comprise any item that can be inspected as described in this disclosure or other items that can be inspected using the techniques of this disclosure, e.g., an item comprising a surface. For example, ware 30 may comprise a glass, a plate or other dishware, a stainless steel coupon, a Tosi plate, one or more fabric swatches, one or more ceramic tiles, etc.

Housing 10 may fully enclose camera 16, LED arrays 20, 24A, 24B, and ware 30 to provide a light-tight environment. That is, housing 10 may be configured to prevent external light sources from penetrating housing 10 and to prevent light emitted by LED arrays 20, 24A, 24B from escaping housing 10. Because system 2 may analyze surfaces of many different types of wares of widely varying materials, shapes and sizes, the lighting conditions, camera angles and other factors that result in an image from which meaningful cleanliness data may be obtained may be quite different for each type of ware. Therefore, the physical configuration of system 2 may be customized for each type of ware or other surface that may be analyzed.

As one example, interior surface of housing 10 may be configured according to the specific ware 30 selected for analysis. For example, the interior surface of housing 10 may be colored black when ware 30 comprises a glass or dishware. In another example, the interior surface of housing 10 may be colored white when ware 30 comprises a stainless steel coupon. Housing 10 may comprise a plurality of interchangeable liners or sheets of various colors for modifying the internal color of housing 10. In this manner, the environment provided by system 2 may be configured according to the ware 30 being analyzed.

Each of LED arrays 20, 24A, 24B may comprise arrays of one or more LEDs. LEDs in an array may be wired in parallel. In some examples, other suitable light sources may be used instead of LEDs for LED arrays 20, 24A, 24B. That is, in other examples, other light sources may be used in addition to or instead of LED arrays. In the example of FIG. 1, LED array 20 generally provides focused lighting to illuminate ware 30, while LED arrays 24A, 24B provide diffused lighting that illuminate the interior of housing 10. In the example of FIG. 1, LED array 20 is connected to LED actuator 22. LED actuator 22 may change the angle of LED array 20 with respect to ware 30. Therefore, LED array 20 need not be positioned directly over ware 30, but may be placed behind or in front of ware 30 and LED array 20 may still illuminate ware 30. LED actuator 22 may also be configured to move LED array 20 up and down arm 14. Arm 14 is also connected to arm actuator 28, which may be configured to move arm 14 forward and back along track 26. LED actuator 22 and arm actuator 28 may comprise mechanical actuators or electro-mechanical actuators controlled by, e.g., analysis computer 40, as described in greater detail below.

Any or all of LED arrays 20, 24A, 24B may be used to illuminate the interior of housing 10. In some examples, LED arrays 20, 24A, 24B are selectively activated according to the type of ware 30 being analyzed. Likewise, LED array 20 may be positioned according to the type of ware 30 being analyzed. For example, when ware 30 comprises a glass or a stainless steel coupon, LED array 20 may be positioned directly above ware 30, with LED arrays 24A and 24B deactivated. As another example, when ware 30 comprises dishware, LED array 20 may be positioned behind ware 30 (relative to camera 16), and LED actuator 22 may configure the angle of LED array 20 to be aimed at ware 30, with LED arrays 24A and 24B deactivated. As another example, when ware 30 comprises one or more fabric swatches or one or more ceramic tiles, LED array 20 may be deactivated and LED arrays 24A, 24B may be activated.

Camera 16 may comprise a digital camera. Settings of camera 16, such as the aperture (iris size), exposure time (shutter speed) and gain may be configured according to a type of ware 30 being analyzed. In the example of FIG. 1, camera 16 may also connected to camera actuator 18, which may adjust the height of camera 16 relative to ware 30 along arm 12. Camera actuator 18 may comprise a mechanical or electro-mechanical actuator controlled by analysis computer 40, as described in greater detail below. In one example, the settings for camera 16 may comprise a lens aperture of f/1.4, a gain of 10 dB, and a shutter speed of 15 milliseconds (ms).

The position of camera 16 relative to ware 30 may be determined by the type of ware 30 being analyzed. In general, the position of camera 16 should be such that the field of view of camera 16 is filled by the portion of ware 30 to be analyzed. For example, different varieties of glasses may be analyzed by system 2. Types of glasses include stemless glasses, stemmed glasses, and marked glasses (e.g., etched glasses). When ware 30 comprises a stemmed glass, camera 16 may be positioned such that the field of view includes as much of the bowl of the glass as possible and excludes the stem. When ware 30 comprises a stemless glass, the field of view may include the whole glass. When ware 30 comprises a marked glass, the field of view may include an unmarked portion of the glass and exclude the marked portion of the glass.

In the example of FIG. 1, camera actuator 18 changes the height of camera 16. Camera 16 may also include a zoom function to zoom in on ware 30. In the example of FIG. 1, ware 30 is positioned on a ware actuator 32. In other examples, a bottom portion of housing 10 may include markings that indicate a location for ware 30. In still other examples, rail 26 may include markings that indicate a location for ware 30. For example, rail 26 may include a plurality of numbered positions that indicate a position for ware 30, and a user may be provided with an indication of which of the numbered positions corresponds to each type of ware.

Analysis computer 40 generally analyzes a digital image of a ware, e.g., ware 30, to determine a luminosity value for the surface of the ware. In other examples, analysis computer 40 may instead determine an intensity value or a brightness value for the ware. Analysis computer 40 may further correlate the luminosity value for the ware to a cleanliness value, a stain value, a fade value, or other value. Conventional methods for analyzing cleanliness of a glass, for example, include assigning a numeric value to the glass as a cleanliness value on a scale of one to five, with one being clean and five being soiled. Analysis computer 40 may therefore automatically assign a cleanliness value on a scale of one to five as a correlated value with the luminosity value. The range of the luminosity value may, in some examples, exceed the range of the cleanliness value. For example, analysis computer 40 may calculate a luminosity value on a scale from 0 to 255, where 0 represents "black" and 255 represents "white." The cleanliness value may generally correspond to spotting, filming, soiling, and/or staining on a variety of wares, such as glasses, dishes, utensils, instruments, or other wares. Stain values may be calculated for wares such as fabric swatches, ceramic tiles, or stainless steel coupons. Fade values may also be calculated for colored fabric swatches that indicate how much of the color of the fabric swatches has faded or how much color is remaining. In general, the luminosity value is a measure of brightness. Therefore, a relatively less expensive monochromatic camera may be used to perform the techniques of this disclosure, without requiring the use of a color camera or a colorimeter. However, in some examples, a color camera may be incorporated into system 2, rather than a monochromatic camera. Additional measurements and calculations may also be made using the color camera and/or a colorimeter, e.g., for particular types of wares, to distinguish between soiling types on the ware, or for other purposes.

In some examples, analysis computer 40 may be configured to analyze a previously captured image of ware 30. In other examples, analysis computer 40 may control camera 16 to capture and retrieve a digital image of ware 30, and then automatically calculate a luminosity value and produce the cleanliness value from the calculated luminosity value. Additionally, in some examples, analysis computer 40 may control camera actuator 18, LED actuator 22, arm actuator 28, ware actuator 32, and/or LED arrays 20, 24A, 24B to provide an environment for capturing a digital image of ware 30. Analysis computer 40 may be configured with a plurality of different types of wares and corresponding environmental settings for each type of ware. Therefore, analysis computer 40 may receive an identification of a type of ware to analyze and automatically configure camera actuator 18, LED actuator 22, arm actuator 28, ware actuator 32, and/or LED arrays 20, 24A, 24B according to the environment settings corresponding to the received ware type identification.

Analysis computer 40 may be configured with environment settings for each type of ware 30 to be analyzed. Analysis computer 40 may be pre-configured with these environment settings or a user may customize the environment settings of analysis computer 40. In general, the environment settings are determined such that analysis computer 40 calculates a proper luminosity value for control wares of a particular type. For example, for a particular type of glass, a user may determine environment settings that cause analysis computer 40 to calculate a luminosity value of 0 for a control glass of that type that is known to be clean and that cause analysis computer 40 to calculate a luminosity value of 255 for a control glass of that type that is known to be soiled. The control clean glass may comprise a glass that one or more experts judge to have a cleanliness value of 1 (on a scale of 1 to 5) and the control soiled glass may comprise a glass that the one or more experts judge to have a cleanliness value of 5 (on a scale of 1 to 5). Once these environment settings are determined, the determined environment settings may be used for analysis of all wares of that particular type.

Figure 2:
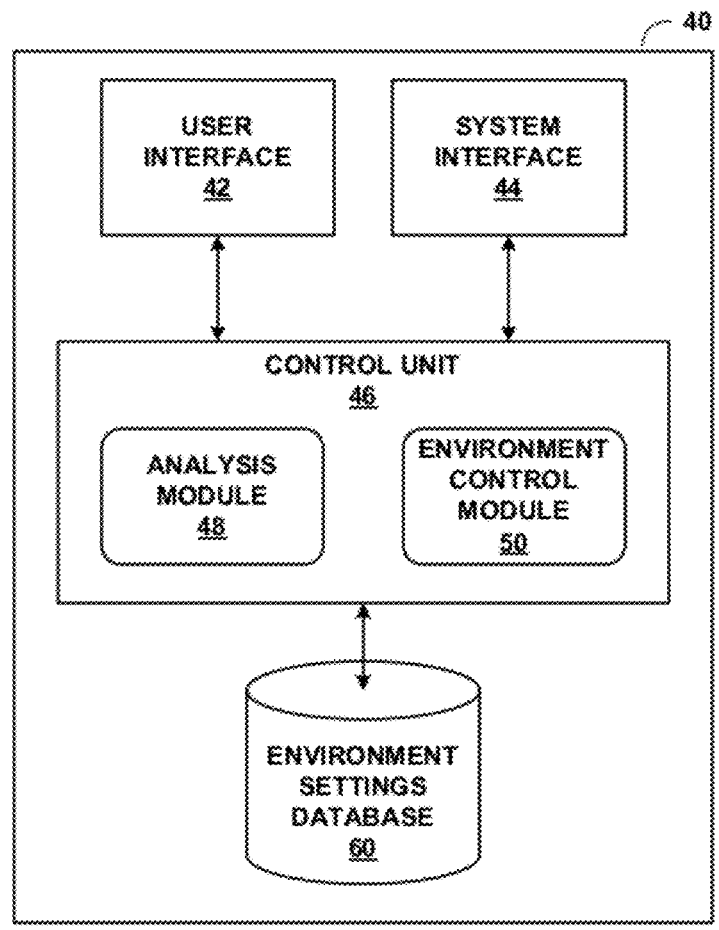
FIG. 2 is a block diagram illustrating components of an example analysis computer.

FIG. 2 is a block diagram illustrating components of an example analysis computer 40. In the example of FIG. 2, analysis computer 40 includes user interface 42, system interface 44, control unit 46, and environment settings database 60. Control unit 46 may comprise a processor or other hardware, such as one or more microprocessors, digital signal processors (DSPs), application specific integrated circuits (ASICs), field programmable gate arrays (FPGAs), or any other equivalent integrated or discrete logic circuitry, as well as any combinations of such components.

Control unit 46 also includes analysis module 48 and environment control module 50 in the example of FIG. 2. Analysis module 48 and environment control module 50 may each comprise hardware units, software modules, or combinations thereof to perform the functions described with respect to these modules. When either or both of analysis module 48 and environment control module 50 are software modules, instructions for these modules may be encoded in a computer-readable medium (not shown) of analysis computer 40. Moreover, control unit 46 may execute the instructions to perform the functions described with respect to these modules.

User interface 42 comprises one or more interface devices, such as a display, keyboard, mouse, graphical user interface (GUI), command line interface, light pen, touch screen, stylus, or other devices for presenting and receiving information to and from a user. Control unit 46 may cause a display of user interface 42 to present information regarding an analysis of ware 30, such as a calculated luminosity value or a cleanliness value. Control unit 46 may also cause the display to present the captured digital image of ware 30. In some examples, control unit 46 may cause the display to simultaneously present representations of a plurality of wares, such as a graphical representation of each of the wares that indicates the cleanliness value for each of the plurality of wares.

System interface 44 may also include interfaces for electronically manipulating one or more of camera actuator 18, ware actuator 32, arm actuator 28, LED actuator 22, camera 16, and/or LED arrays 20, 24A, 24B. System interface 44 may receive signals from environment control module 50 and/or control unit 46 to manipulate one or more of these components of system 2 and transmit an electrical signal to the corresponding component. For example, system interface 44 may send signals to move camera actuator 18, ware actuator 32, arm actuator 28, and/or LED actuator 22. System interface 44 may also send signals to camera 16 to change settings of the camera (e.g., aperture and/or shutter speed settings), signals to cause camera 16 to capture a digital image, or signals to retrieve one or more digital images from camera 16. System interface 44 may further send signals to enable or disable LEDs of LED arrays 20, 24A, 24B.

Analysis computer 40 may store environment settings for one or more types of wares in environment settings database 60. For each type of ware, analysis computer 40 may store an entry in environment settings database 60. Analysis computer 40 may store new entries in environment settings database 60 for new types of wares. A user may interact with analysis computer 40 via user interface 42 to add, view, modify, or delete entries of analysis computer 40. Each entry of environment settings database 60 may include settings for a position of camera 16, a position and angle of LED array 20, whether LED array 20 is enabled or disabled, whether LED arrays 24A, 24B are enabled or disabled, a position for ware actuator 32, and a position for arm 14.

In some examples, each entry of environment settings database 60 may also include instructions to display to a user via user interface 42, such as a color to use on the internal walls of housing 10. In examples without ware actuator 32, entries of environment settings database 60 may include instructions to display to the user as to a position or location of ware 30. The user may therefore read the instructions and place ware 30 in the proper position.

Analysis module 48 analyzes digital images retrieved from camera 16 by environment control module 50. In some examples, analysis module 48 may also analyze digital images stored on a computer-readable medium (not shown) of analysis computer 40, for example, a hard disk, an optical disk, a floppy disk, a flash drive, a Secure Digital card, or other computer-readable medium. In general, analysis module 48 analyzes the digital image to calculate a luminosity value for the digital image. In some examples, analysis module 48 calculates the luminosity value from all of the digital image, while in other examples, analysis module 48 calculates the luminosity value from only a portion of the digital image, i.e., a region of interest of the digital image. Calculating the luminosity value from a region of interest may exclude non-ware portions of the digital image, glare from the light source(s), or other portions of the digital image that should not be factored into the calculation of the luminosity value. In some examples, analysis module 48 may calculate a plurality of luminosity values each corresponding to different regions of the digital image, e.g., to calculate luminosity values for each swatch of a fabric swatch array or each tile of a group of ceramic tiles.

Analysis module 48 may calculate a region of interest of a digital image according to particular instructions. Analysis module 48 may also receive a definition of a region of interest from a user. In some examples, the region of interest may correspond to the entire digital image. In any case, analysis module 48 calculates a luminosity value based on an average of values of pixels in the region of interest. When the digital image comprises a black-and-white image, each pixel may have a value in a numeric range, e.g., 0 to 255, where 0 represents black and 255 represents white. Analysis module 48 may calculate a luminosity value by calculating the average pixel value of the pixels in the region of interest. Analysis module 48 may also calculate a histogram with bins ranging from 0 to 255, where each bin stores a value representative of the number of pixels in the region of interest with a pixel value of the corresponding bin. For example, if there are 8 pixels with a value of "18," bin 18 of the histogram would store a value of "8." In some examples, analysis module 48 may cause user interface 42 to display a graphical representation of the histogram. Analysis module 48 may calculate a luminosity value using the average of the pixel values or the histogram. Analysis module 48 may also calculate other statistics, such as a standard deviation of the pixel luminosity values.

Analysis module 48 may also calculate luminosity values for color digital images. In some examples, each pixel of a color digital image may comprise values for red, green, and blue (RGB). Analysis module 48 may convert color digital images in the RGB domain to the $YC_bC_r$ (or YUV) domain, where Y represents luminosity and $C_b$ and $C_r$ represent color information for the pixel. Analysis module 48 may then use the Y-values of pixels as pixel luminosity values and calculate an average of the pixel luminosity values in the region of interest using the methods described above, e.g., an average over the pixels or by calculating a histogram. Analysis module 48 may also calculate luminosity values for each pixel in the RGB domain directly.

Analysis module 48 may further determine a cleanliness value for ware 30 based on the calculated luminosity value. For certain types of wares, a higher luminosity value indicates that the ware is clean, whereas for other types of wares, a lower luminosity value indicates that the ware is clean. Analysis computer 40 may store correlations for the type of ware being analyzed in environment settings database 60. Each entry of environment settings database 60 may further include one or more thresholds for luminosity values that define cleanliness of the ware for luminosity values. For example, for a particular type of glass, the thresholds may correspond to the conventional ratings of 1 to 5, e.g., a first threshold at 50, a second threshold at 101, a third threshold at 152, and a fourth threshold at 204. In this example, analysis module 48 may determine that a glass with a luminosity value between 0 and 50 has a cleanliness value of 1, a glass with a luminosity value between 51 and 101 has a cleanliness value of 2, a glass with a luminosity value between 102 and 153 has a cleanliness value of 3, a glass with a luminosity value between 154 and 203 has a cleanliness value of 4, and a glass with a luminosity value between 204 and 255 has a cleanliness value of 5. In the above example, the functional relationship between luminosity values and cleanliness values is linear. In other examples, the functional relationship between luminosity values and cleanliness values may be, for example, quadratic, exponential, logarithmic, or another mathematical relationship.

Analysis module 48 may cause user interface 42 to display or otherwise present the determined cleanliness value for ware 30 to a user. User interface 42 may also present other data, such as the luminosity value, calculated statistics for the region of interest, a representation of a histogram, a comparison between two or more wares, or other information.

Figure 3:
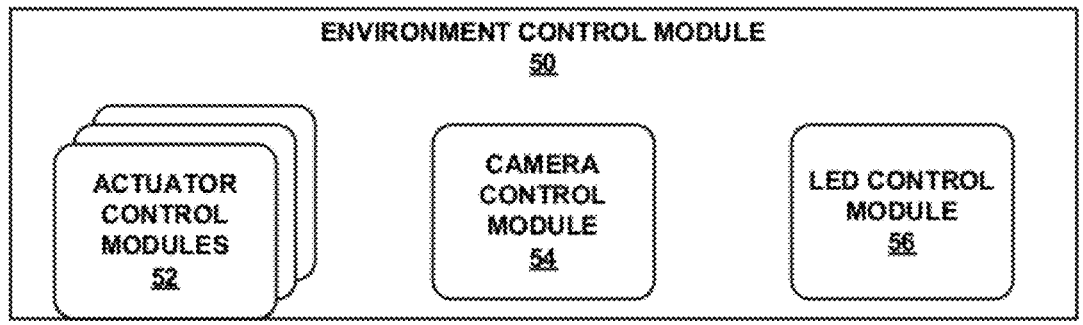
FIG. 3 is a block diagram illustrating components of an example environmental control module.

FIG. 3 is a block diagram illustrating components of an example environmental control module 50. In the example of FIG. 3, environmental control module 50 includes a plurality of actuator control modules 52, camera control module 54, and LED control module 56. Each of actuator control modules 52 corresponds to a respective actuator, e.g., camera actuator 18, ware actuator 32, LED actuator 22, and arm actuator 28 of FIG. 1. Other examples with more or fewer actuators may include correspondingly more or fewer actuator control modules 52.

In general, each of actuator control modules 52 sends electrical signals to a corresponding actuator to control the actuator. Each of actuator control modules 52 may also include logic in hardware and/or software to determine when to stop sending an electrical signal to the corresponding actuator in order to properly position the actuator. For example, one of actuator control modules 52 may apply a specific voltage or current to the corresponding actuator for a specific amount of time to move the actuator a desired amount. As another example, one of actuator control modules 52 may send different signals to the corresponding actuator based on the desired amount of movement, e.g., when the actuator is capable of calculating distance of movement and/or current position.

Camera control module 54 sends one or more electrical signals to camera 16 (FIG. 1) to control camera 16. For example, camera control module 54 may send various electrical signals to camera 16 to adjust aperture settings, shutter speed settings, and zoom settings of camera 16. Camera control module 54 may also send an electrical signal to camera 16 to cause camera 16 to capture a digital image. Camera control module 54 may further send an electrical signal to camera 16 to retrieve a captured digital image, and may receive electrical signal from camera 16 representative of the captured digital image. Upon receiving a digital image from camera 16, camera control module 54 may store the image in a computer-readable medium (not shown) of analysis computer 40 and send a signal to analysis module 48 that an image is available for analysis.

LED control module 56 may send electrical signals to LED arrays 20, 24A, 24B to enable and/or disable LED arrays 20, 24A, 24B. In some examples, LED control module 56 may send an electrical signal to toggle one or more of LED arrays 20, 24A, 24B on or off. In other examples, LED control module 56 continuously sends an electrical signal to one or more of LED arrays 20, 24A, 24B that are to be turned on and does not send an electrical signal to the other LED arrays to that are to be turned off. LED control module 56 may also provide a specific voltage and/or current to LED arrays 20, 24A, 24B. For example, LED control module 56 may enable LED array 20 by providing 0.23 amps and 2.2 volts to LED array 20.

Figure 4:
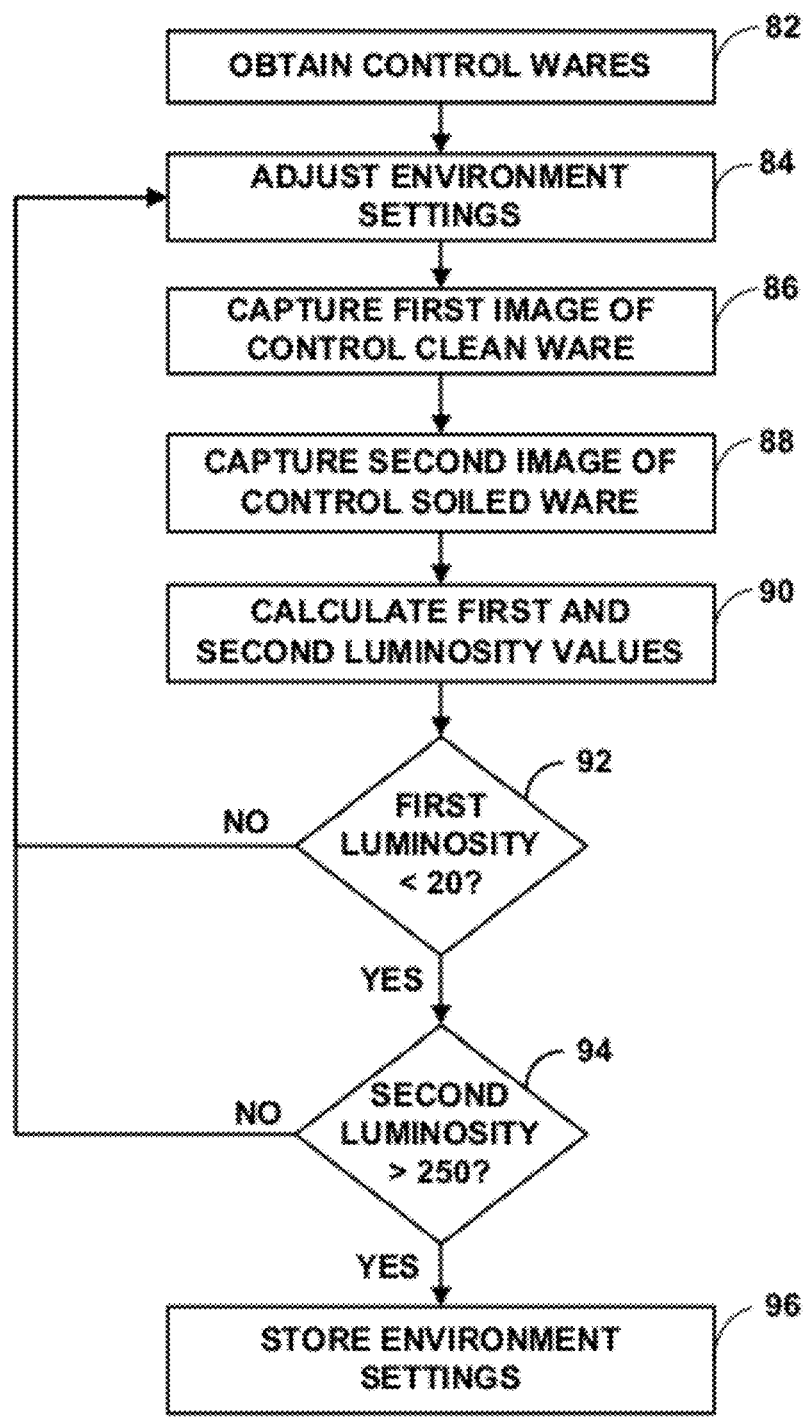
FIG. 4 is a flowchart illustrating an example method for configuring an environment for a particular type of ware.

FIG. 4 is a flowchart illustrating an example method for configuring an environment for a particular type of ware. Although the example method of FIG. 4 is discussed with respect to a glass, it should be understood that similar methods may be used to configure an environment for any type of surface or ware that can be analyzed by system 2 (FIG. 1) or similar systems. In general, the method of FIG. 4 comprises creating an environment for capturing digital images of wares of the type to be analyzed such that an analysis system determines appropriate cleanliness values for captured digital images of control wares in the environment, where the control wares have known cleanliness values. Once this environment is determined, analysis computer 40 may analyze captured digital images of wares with unknown cleanliness values in the same environment and automatically adjust system 2 to conform to the determined environment (in some examples). Therefore, the method of FIG. 4 comprises one example of a method for calibrating an environment in which to capture digital images of a particular type of ware.

Initially, control wares of the type being analyzed (glasses, in this example) are obtained (82). In the example method of FIG. 4, two control wares are obtained: a control clean ware and a control soiled ware. For glasses, as in this example, the control clean ware may comprise a glass that has never been used or a glass that has been washed a certain number of times. The control clean ware may also be inspected by an expert, who determines that the control clean ware is clean, e.g., has a cleanliness value of 1 on a scale of 1 to 5. Similarly, the control soiled ware may comprise a glass that has been sufficiently soiled, and an expert may determine that the control soiled ware has a cleanliness value of 5 on a scale of 1 to 5. In other examples, additional control wares may be used, e.g., glasses for which an expert has determined a cleanliness value of 2, 3, or 4.

An environment for capturing digital images of a ware may include lighting settings such as direct or diffused lighting, distance of a light source from ware 30, angle of direct lighting to ware 30, camera aperture, camera shutter speed, internal color of housing 10 (FIG. 1), distance of camera 16 from ware 30, or other settings. An operator or other user of system 2 may adjust any or all of these settings (84). In one example, the operator may manually configure the environment. In another example, the operator may control the environment configuration using analysis computer 40. In another example, the operator may manually configure some environment settings and configure other environment settings using analysis computer 40.

The operator may then capture a first image of the control clean ware (86) and a second image of the control soiled ware (88). The operator may then use analysis computer 40 to calculate a first luminosity value for the first image and a second luminosity value for the second image (90). In general, the method of FIG. 4 includes adjusting the environment settings and capturing new images of the control wares until analysis computer 40 produces appropriate luminosity values for the images of the control wares. In the example method of FIG. 4, a threshold for the image of the control clean glass comprises a clean threshold luminosity value and a threshold for the image of the control soiled glass comprises a soiled threshold luminosity value. Thus when the first luminosity value is less than 20 (92) and the second luminosity value is greater than 250 (94), analysis computer 40 stores the environment settings, e.g., in environment settings database 60

(96). In other examples, other threshold luminosity values may be used, and additional threshold values may be used for additional control wares. Also, in other examples, an operator may manually record the environment settings in a notebook or text or other file stored on analysis computer 40.

Figure 5:
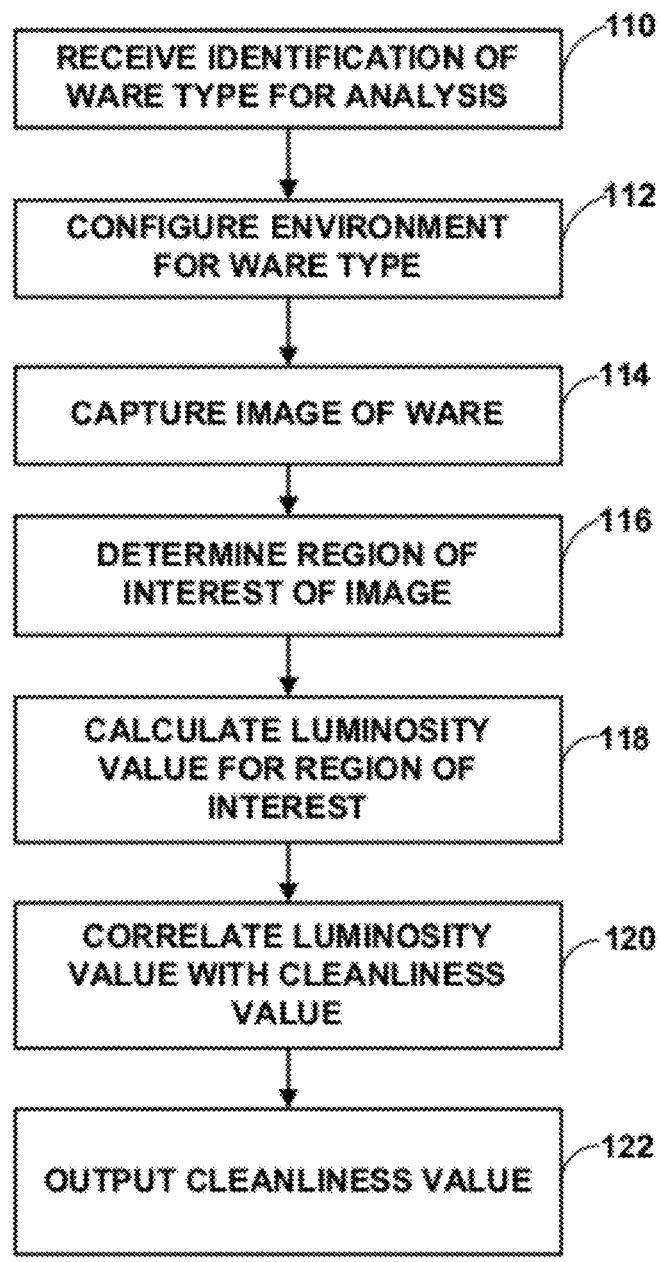
FIG. 5 is a flowchart illustrating an example method for calculating a cleanliness value of a particular type of ware.

FIG. 5 is a flowchart illustrating an example method for calculating a cleanliness value of a particular type of ware. Initially, analysis computer 40 receives an identification of a type of ware corresponding to ware 30 (FIG. 1) to be analyzed (110). For example, a user may select a ware type using user interface 42 that is stored in environment settings database 60. Analysis computer 40 may query environment settings database 60 to present a list of available ware types to the user. In some examples, analysis computer 40 may reject a ware type when environment settings have not been established for that ware type. When environment settings for a particular ware type have not been defined, the user may first perform the calibration process of FIG. 4 to define environment settings for the particular type of ware to be analyzed.

After receiving an identification of the type of ware being analyzed, analysis computer 40 may automatically configure the environment of system 2 to capture an image of ware 30 according to the identified type of ware to be analyzed (112). For example, environment control module 50 of analysis computer 40 may query environment settings database 60 with the identification of the ware type to retrieve environment settings from environment settings database 60. Environment control module 50 may then automatically adjust elements of system 2 according to the retrieved environment settings. For example, environment control module 50 may send one or more electrical signals via system interface 44 to camera actuator 18 to position camera 16 at an appropriate height, to ware actuator 32 to position ware 30 an appropriate distance from camera 16, to LED actuator 22 and arm actuator 28 to position LED array 20 at an appropriate position, to one or more of LED arrays 20, 24A, 24B to enable and/or disable LED arrays 20, 24A, 24B, and to camera 16 to adjust aperture settings, shutter speed settings, and zoom settings. Analysis computer 40 may further display instructions via user interface 42 to the user to adjust certain elements of the environment. For example, the display may include instructions to configure an internal color of housing 10 and a position for ware 30 in examples that do not include ware actuator 32.

After the environment has been configured, analysis computer 40 may send an electrical signal to camera 16 to capture a digital image of ware 30 (114). Analysis computer 40 may then retrieve the captured digital image from camera 16. In other examples, an operator or other user may manually capture a digital image and transfer the image to analysis computer 40.

After analysis computer 40 has received a digital image of the ware to be analyzed, analysis computer 40 may determine a region of interest of the digital image to analyze (116). In some examples, the region of interest may comprise the entire digital image. In other examples, a user may configure the region of interest. For example, analysis computer 40 may display the captured digital image and receive a selection of the image from the user as the region of interest. In other examples, analysis computer 40 may be configured to automatically select the region of interest. For example, analysis computer 40 may be configured to detect boundaries of ware 30 in the digital image.

Analysis module 48 of analysis computer 40 may then calculate a luminosity value for the region of interest (118). For example, analysis module 48 may determine luminosity values for pixels in the region of interest, e.g., on a scale from 0 to 255, where 0 represents black and 255 represents white. Analysis module 48 may then calculate an average luminosity value for the region of interest as the luminosity value, e.g., according to the method of FIG. 6.

Analysis module 48 may then correlate the calculated luminosity value with a cleanliness value for the type of ware 30 (120). For example, for a certain type of glass, luminosity values less than 20 may correlate to a cleanliness value of 1, less than 50 may correlate to a cleanliness value of 2, less than 100 may correlate to a cleanliness value of 3, less than 200 may correlate to a cleanliness value of 4, and 200 or greater may correlate to a cleanliness value of 5. Analysis module 48 may then output the cleanliness value correlated to the luminosity value (122), e.g., by displaying the cleanliness value via user interface 42.

Figure 6:
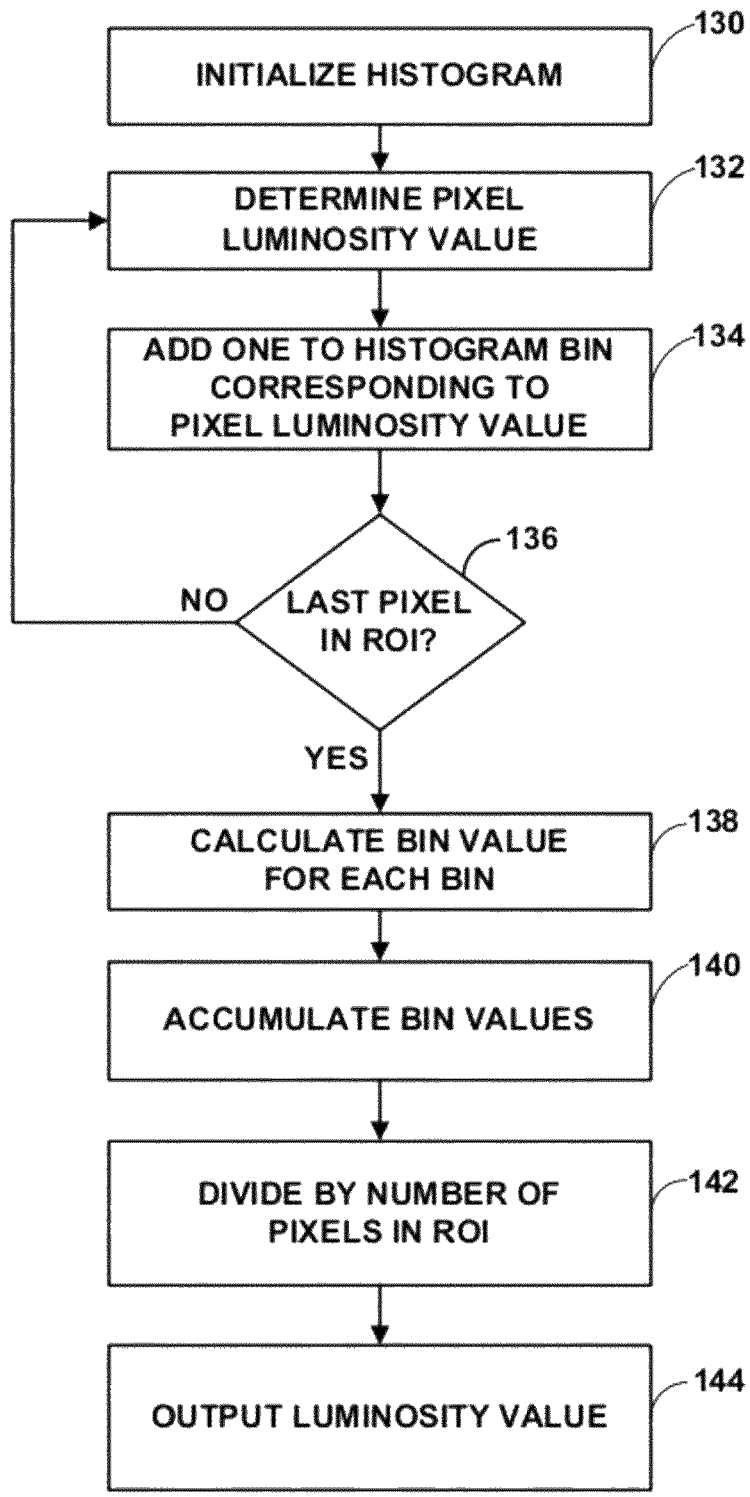
FIG. 6 is a flowchart illustrating an example method for calculating an average luminosity value for a region of interest of a digital image of a ware to be analyzed.

FIG. 6 is a flowchart illustrating an example method for calculating an average luminosity value for a region of interest of a digital image of a ware to be analyzed. Although the method of FIG. 6 is described as performed by analysis module 48 (FIG. 2), it should be understood that other hardware or software modules, or combinations thereof, may perform the method of FIG. 6.

In general, the method of FIG. 6 includes constructing a 256 bin histogram (e.g., an integer array bin[256]) from the region of interest, then for each pixel, identifying the bin corresponding to the luminosity value of the pixel and add one to the current value of the corresponding bin, and then calculating the average luminosity according to the following formula:

$$\text{average\_luminosity}(\text{bin}[]) = \frac{\sum_{i=0}^{255} \text{bin}(i) * i}{\sum_{i=0}^{255} \text{bin}(i)}$$

Initially, analysis module 48 constructs a histogram with 256 bins labeled 0 to 255, where the bins each correspond to a numeric value and initializes each of the 256 bins to a value of zero (130). Although the example method of FIG. 6 uses an array of 256 bins, it should be understood that other sizes may be used. In general, the size of the array corresponds to the range of luminosity values of pixel values in the digital image. The histogram may comprise an integer array with 256 elements indexed by 0, i.e., an array with elements numbered 0 to 255. Analysis module 48 may then, starting with a first pixel of the region of interest, determine a luminosity value for the pixel (132) and add one to the current value of the array element indexed by the luminosity value of the pixel (134). That is, for pixel x in the region of interest, analysis module 48 determine luminosity(x) and adds one to the current value of the element of the array indexed by luminosity(x). Thus for histogram array bin[ ], and pixel x, analysis module 48 may perform the operation bin[luminosity(x)]=bin[luminosity(x)]+1.

Analysis module 48 may then determine whether all of the pixels in the region of interest have been analyzed (136). If not ("NO" branch of 136), analysis module 48 may analyze a next pixel of the region of interest and modify the histogram using the luminosity value of that next pixel. When all of the pixels in the region of interest have been analyzed ("YES" branch of 136), analysis module 48 calculates a luminosity value for the region of interest.

In the example of FIG. 6, analysis module 48 first calculates a bin value for each bin of the histogram (138). In general, the bin value of bin i is the number of pixels with luminosity value i multiplied by i. Thus, for histogram bin[ ], the bin value of bin i is bin[i]*i. After calculating each bin value, analysis module 48 accumulates the bin values (140) and divides by the number of pixels in the region of interest (142) to calculate the luminosity value for the region of interest. Analysis module 48 may then return the luminosity value or otherwise output the luminosity value (144).

The following pseudocode for the function average Luminosity presents one example implementation of a method for calculating a luminosity value for a region of interest of a digital image of a ware being analyzed. In the pseudocode, average Luminosity returns an integer value representative of the calculated luminosity value. Picture[ ][ ] is a two-dimensional integer array that stores pixels of the digital image of a ware for analysis. A region of interest (ROI) is defined in terms of boundaries within the array picture[ ][ ].

```
int averageLuminosity (int picture[ ][ ], int ROITop, int ROIBottom, int
ROILeft, int ROIRight) {
    /* receives a two-dimensional array picture with defined boundaries
     * ROITop, ROIBottom, ROILeft, and ROIRight that define a region of
     * interest; outputs an average luminosity value for the region of interest
     */
    int bin[256];
    for (int i=0; i<256; i++) {
        bin[i] = 0;
    }
    for (int i = ROIBottom; i <= ROITop; i++) {
        for (int j = ROILeft; j <= ROIRight; j++) {
            int pel_luminosity = luminosity(picture[i][j]);
            bin[pel_luminosity]++;
        }
    }
    int numPixels = 0;
    int accumulatedLuminosity = 0;
    for (int i = 0; i < 256; i++) {
        numPixels += bin[i];
        accumulatedLuminosity += i*bin[i];
    }
    int luminosity = accumulatedLuminosity / numPixels;
    return luminosity;
}
```

Figure 7:
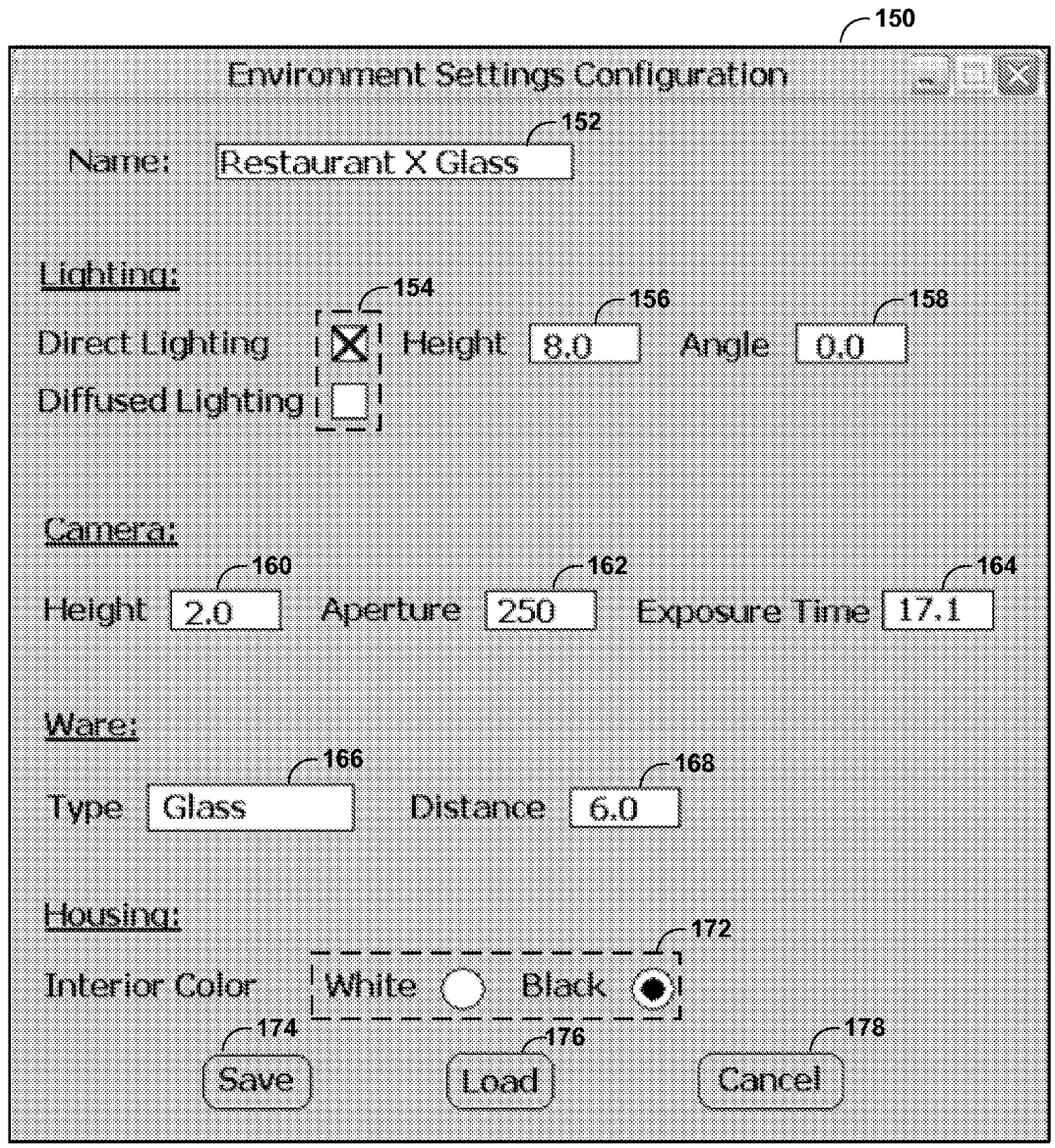
FIG. 7 is a screenshot illustrating an example graphical user interface for configuring environment settings in which to capture a digital image of a ware for analysis.

FIG. 7 is a screenshot illustrating an example graphical user interface for configuring environment settings in which to capture a digital image of a ware for analysis in accordance with the techniques of this disclosure. Analysis computer 40 may display user interface 150 via a display of user interface 42. Analysis computer 40 may populate data fields of user interface 150 to allow a user to view and/or edit environment settings associated with a particular ware type as stored in environment settings database 60. Analysis computer 40 may also present user interface 150 to enable a user to create a new entry in environment settings database 60.

In the example of FIG. 7, user interface 150 generally allows a user to modify environment settings relating to lighting, camera settings for camera 16, a type and position for ware 30, and an internal color of housing 10. User interface 150 presents a name for the environment settings in name text box 152. The name presented in name text box 152 may generally correspond to a name of a ware type. In the example of FIG. 7, a user has entered a name of "Restaurant X Glass" in name text box 152.

User interface 150 includes check boxes 154 that allow a user to enable or disable direct lighting and diffused lighting. Direct lighting may correspond to LED array 20 (FIG. 1) and diffused lighting may correspond to LED arrays 24A, 24B

(FIG. 1). Therefore, a user may selectively enable and disable LED arrays 20, 24A, 24B by checking or unchecking check boxes 154.

When the check box for direct lighting is not checked, user interface 150 may present height text box 156 and angle text box 158 as grayed out and not allow a user to enter data in either height text box 156 or angle text box 158. User interface 150 may also gray out labels "Height" and "Angle" associated with height text box 156 and angle text box 158 when the check box for direct lighting is unchecked. When the check box for direct lighting is checked, as shown in FIG. 7, user interface 150 presents height text box 156 and angle text box 158. In this manner, a user may configure a height of LED array 20 and an angle of LED array 20 with respect to ware 30.

In the example of FIG. 7, a user has checked the box associated with direct lighting, unchecked the box associated with diffused lighting, entered a height value of "8.0" in height text box 156, and an angle value of "0.0" in angle text box 158. Analysis computer 40 may therefore cause LED actuator 22 to position LED array 20 at a height of 8.0 inches (20.32 cm) with an angle of 0.0 degrees when capturing an image of a ware of type "Restaurant X Glass." Analysis computer 40 may also cause arm actuator 28 to position arm 14 such that LED array 20 is positioned directly above ware 30 for a ware of type "Restaurant X Glass."

User interface 150 also allows a user to modify camera settings for camera 16 to capture an image of a ware of type "Restaurant X Glass." In the example of FIG. 7, user interface 150 includes camera height text box 160, camera aperture text box 162, and camera exposure time text box 164. A user may enter values in camera height text box 160 to set a height of camera 16. A user may also enter values in camera aperture text box 162 to establish an aperture setting for camera 16. A user may also enter values in camera exposure time text box 164 to establish an exposure time setting for camera 16.

In the example of FIG. 7, a user has entered values of "2.0" in camera height text box 160, "250" in camera aperture text box 162, and "17.1" in camera exposure time text box 164. Analysis computer 40 may therefore cause camera actuator 18 to position camera 16 at a height of 2.0 inches (5.08 cm), and may adjust camera aperture and exposure time settings according to the values entered in camera aperture text box 162 and camera exposure time text box 164.

User interface 150 also allows a user to define a basic type for the ware in ware type text box 166. In some examples, analysis computer 40 may populate the text boxes of user interface 150 with default values based on the type information entered in ware type text box 166. In some examples, ware type text box 166 may instead comprise a drop-down menu or other user interface object for selecting a generic type for the ware. User interface 150 additionally presents ware distance text box 168, which defines how far ware 30 should be from camera 16 when capturing an image of ware 30. In some examples, analysis computer 40 causes ware actuator 32 to position ware 30 at a distance according to the data entered in ware distance text box 168. In examples that do not include ware actuator 32, analysis computer 40 may instead cause user interface 42 to display an indication of where to place ware 30 when capturing an image of ware 30.

In the example of FIG. 7, a user has entered "6.0" in ware distance text box 168. Therefore, analysis computer 40 may cause ware actuator 32 to position ware 30 at a distance of 6 inches (15.24 cm) from camera 16, or to display instructions to a user to position ware 30 at a distance of 6 inches (15.24 cm) from camera 16 before capturing an image of ware 30 of type "Restaurant X Glass.".

User interface 150 also allows a user to define an interior color of housing 10 to use when capturing an image of a ware of type "Restaurant X Glass." In the example of FIG. 7, user interface 150 includes housing interior color radio buttons 172. A user may select either "white" or "black" using housing interior color radio buttons 172. In the example of FIG. 7, a user has selected "black." Other examples may include additional colors or other representations of interior housing colors. Analysis computer 40 may cause user interface 42 to display instructions to a user as to what color to use for the interior of housing 10 when capturing an image of ware 30 when ware 30. For example, when capturing an image of a ware of type "Restaurant X Glass," analysis computer 40 may cause user interface 42 to display instructions to a user to use a black interior color for housing 10.

User interface 150 also presents save button 174, load button 176, and cancel button 178. When a user selects save button 174, user interface 150 sends data from the text boxes to control unit 46, which in turn stores associated data to environment settings database 60. When the value of name text box 152 is not a current entry in environment settings database 60, control unit 46 creates a new entry in environment settings database 60 for the data from user interface 150. However, when an entry for the value of name text box 152 already exists in environment settings database 60, control unit 46 updates the entry according to the data received from user interface 150. When a user selects load button 176, user interface 150 may receive an identification of a ware type to load, send the identification to control unit 46, receive data for the loaded ware type from environment settings database 60 via control unit 46, and populate the fields according to the data received from environment settings database 60. A user may also cancel modifications to a new or existing ware type by selecting cancel button 178.

Figure 8:
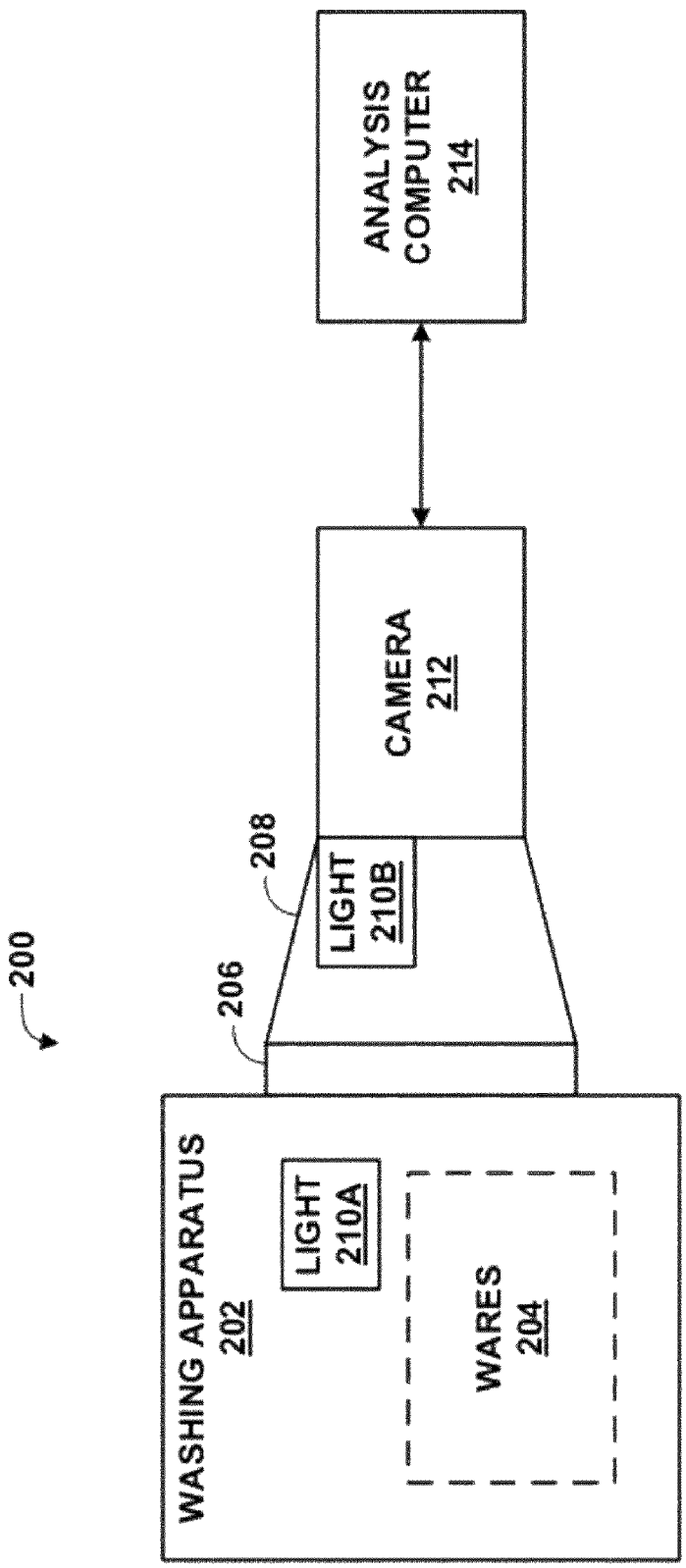
FIG. 8 is a block diagram illustrating an example system in which an analysis computer automatically disables a washing apparatus.

FIG. 8 is a block diagram illustrating an example system 200 that implements the techniques of this disclosure to automatically cause washing apparatus 202 to stop washing wares when a calculated luminosity value exceeds a threshold. Washing apparatus 202 may comprise, for example, a dishwasher, a fabric washing machine, a machine to sterilize wares such as surgical instruments, or other warewashing machine.

System 200 includes washing apparatus 202, window 206, housing 208, lights 210A, 210B, camera 212, and analysis computer 214. Some examples may include only one of lights 210A, 210B, rather than both lights 210A, 210B as shown in FIG. 8. In the example of FIG. 8, light 210A is positioned within washing apparatus 202 and light 210B is positioned outside of washing apparatus 202. Lights 210A, 210B may comprise LED arrays or other light sources to illuminate wares 204 via direct or indirect lighting. Washing apparatus 202 applies a washing procedure to wares 204, which may include applying one or more chemicals (such as detergent, rinse agent, disinfectant, sanitizer, etc.) to wares 204. Camera 212 captures digital images of wares 204 during the washing procedure, and analysis computer 214 analyzes the digital images to calculate a cleanliness value for wares 204. Analysis computer 214 may include components similar to those of analysis computer 40 as described with respect to FIGS. 1 and 2.

Window 206 may comprise a substantially transparent or translucent material such as glass, plexiglass, plastic, or other material that allows light to pass. Camera 212 may be positioned such that camera 212 is able to capture an image of one or more wares 204, or a portion thereof. In one example, camera 212 may be positioned to capture an image of one ware that is determined to be representative of wares 204 generally. Lights 210A and/or 210B are positioned such that the ware is properly illuminated. Housing 208 provides a light-tight environment for camera 212 and washing apparatus 202. A user may customize an interior color of housing 208, e.g., white or black, in some examples.

In some examples, system 200 may exclude housing 208. For example, analysis computer 214 and camera 212 may be configured such that a light-tight environment is not necessary. A user may configure analysis computer 214 and camera 212 such that analysis computer 214 determines that a control clean ware is clean and that a control soiled ware is soiled, which may involve modifying lights 210A, 210B and settings of camera 212 without including housing 208.

Analysis computer 214 may control washing apparatus 202, lights 210A, 210B, and camera 212. For example, analysis computer 214 may send electrical signals to enable and/or disable either or both of lights 210A, 210B, to enable or disable washing apparatus 202, to modify settings of camera 212, to cause camera 212 to capture an image, and to retrieve an image from camera 212.

In one example, analysis computer 214 may receive a command from a user (not shown) to start washing apparatus 202. The user may initially place wares 204 in washing apparatus 202. In turn, analysis computer 214 may send an electrical signal to washing apparatus 202 to begin washing wares 204. After washing apparatus 202 begins operating, analysis computer 214 may send signals to cause camera 212 to begin capturing images of wares 204. Analysis computer 214 may analyze images of wares 204 to calculate a cleanliness value for wares 204, e.g., using the techniques described above of calculating a luminosity value for wares 204 and correlating the luminosity value with a cleanliness value.

Analysis computer 214 may further be configured with a threshold cleanliness value. When analysis computer 214 determines that the calculated cleanliness value for wares 204 exceeds the threshold, analysis computer 214 may automatically disable washing apparatus 202. While analysis computer 214 determines that the calculated cleanliness value does not exceed the threshold, analysis computer 214 causes washing apparatus 202 to continue the washing process. In this manner, analysis computer 214 may ensure that wares 204 are washed only until they are clean, rather than for a predetermined cycle time. Therefore analysis computer 214 may prevent system 200 from using excess washing chemicals, excess water, and excess electricity, and may continue to wash wares 204 until analysis computer 214 determines that wares 204 are clean.

Alternatively, the user may activate washing apparatus 202 manually and send a command to analysis computer 214 to begin analyzing digital images captured by camera 212. Analysis computer 214 may then output a signal to the user when analysis computer 214 determines that wares 204 are clean, e.g., that the cleanliness value of wares 204 exceeds the threshold. The signal may comprise one or more of flashing a light, producing an audible sound by activating a buzzer or beeper or by playing a recording over speakers, displaying a message via a display of a user interface, or other signal. The user may then turn off washing apparatus 202 upon receiving the signal.

Figure 9:
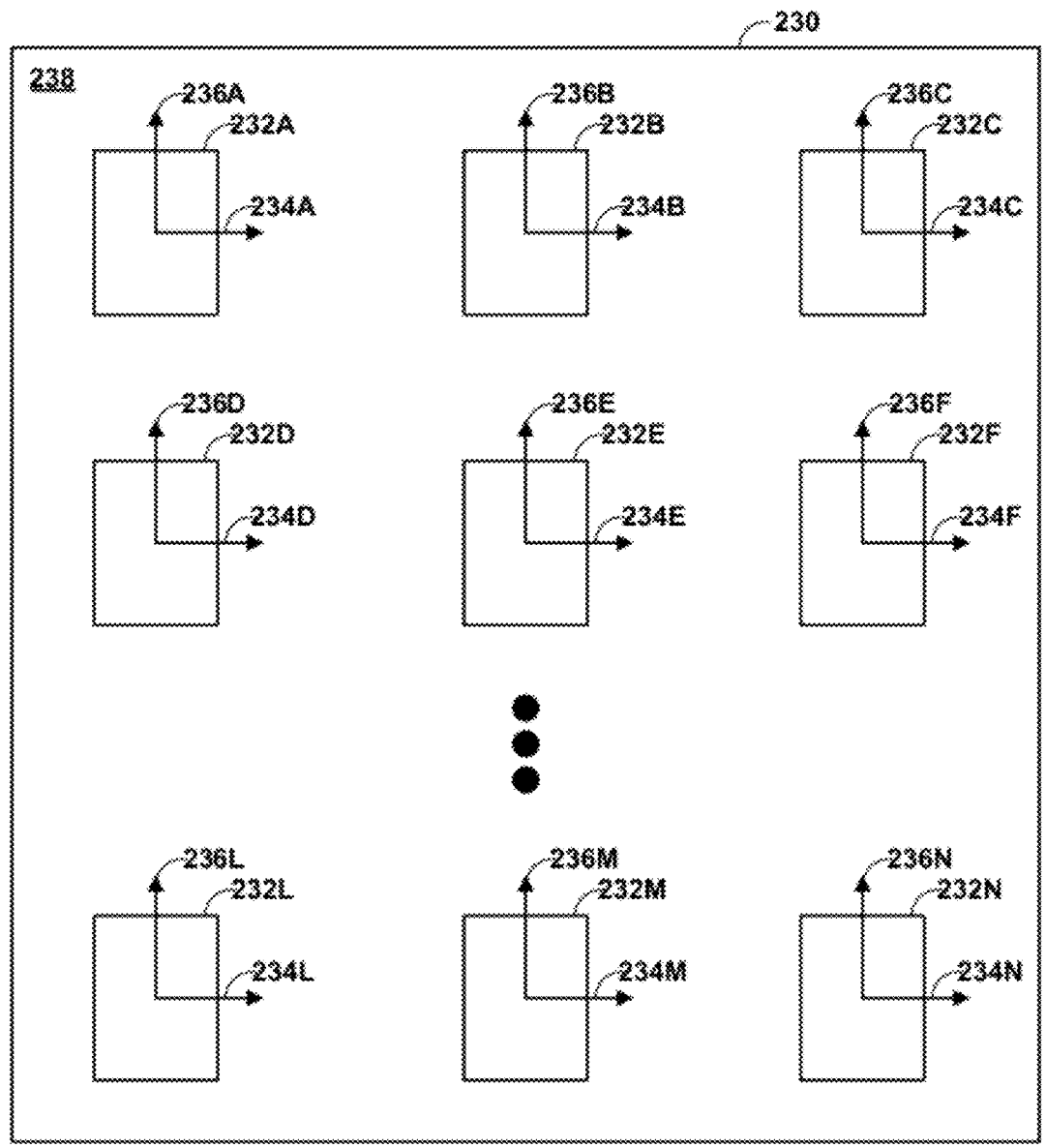
FIG. 9 is a block diagram illustrating an example fabric swatch array that may be analyzed as a ware by the system of FIG. 1.

FIG. 9 is a block diagram illustrating an example fabric swatch array 230 that may be analyzed according to the techniques of this disclosure. Fabric swatch array 230 includes one or more fabric swatches 232A-232N (fabric swatches 232) positioned on a background fabric 238. In one example, fabric swatch array 230 may correspond to ware 30 (FIG. 1). In general, a fabric swatch array that may be analyzed by system 2 (FIG. 1) may include any number of fabric swatches 232 and in any arrangement, so long as analysis computer 40 is able to distinguish images of fabric swatches 232 from each other and from background fabric 238 of fabric swatch array 230. Fabric swatch array 230 generally includes background fabric 238 and a plurality of fabric swatches 232 stitched or otherwise fixed to background fabric 238. In one example, background fabric 238 of fabric swatch array 230 may comprise a different color than fabric swatches 232. For example, fabric swatches 232 may each comprise white cloth and background fabric 238 may comprise green or black cloth. In other examples, other colors of fabric swatches 232 and background fabric 238 may be used.

Each of fabric swatches 232 may comprise substantially identical pieces of fabric. Fabric swatch arrays such as fabric swatch array 230 may be used to test the efficacy of various cleaning agents, which may include testing removal of soiling, removal of stains, or whether the cleaning agents cause fading in the coloring of fabric swatches 232. Similarly, fabric swatch array 230 may be used to test the efficacy of a particular type of fabric, e.g., resistance to soiling and staining and resistance to fading. In some examples, each of fabric swatches 232 may comprise different pieces of fabric to test the effects of a particular type of soiling on each of the fabrics or to test the effects of a particular chemical agent applied to each of the fabrics.

In one example, where each of fabric swatches 232 comprises substantially identical pieces of fabric, each of fabric swatches 232 may be soiled using a different soiling or staining agent, such as topsoil, grass, lipstick, wine, foodstuffs, or other such soiling agents. One of fabric swatches 232, e.g., fabric swatch 232A, may be left unsoiled as a control swatch. Fabric swatch array 230 may then be washed in a fabric washing machine using particular chemical cleaning product (s) for which analysis is desired.

After washing fabric swatch array 230, fabric swatch array 230 may be used as part of system 2 (FIG. 1) or a similarly configured system to perform the techniques of this disclosure. Although the techniques described with respect to FIG. 1 comprise determining a single cleanliness value for a particular ware, analysis computer 40 may instead determine individual cleanliness values for each of fabric swatches 232. That is, camera 16 may capture a digital image of all or a subset of fabric swatches 232, and analysis computer 40 may determine cleanliness values for each of the fabric swatches 232 in the image. In some examples, camera 16 may capture a single image of the entire fabric swatch array 230, while in other examples, camera 16 may capture images of various subsections of fabric swatch array 230.

In some examples, a user may highlight each of fabric swatches 232, and select a region of interest thereof. In some examples, a user may highlight each of fabric swatches 232, and analysis computer 40 may automatically calculate a region of interest. In other examples, analysis computer 40 may be configured to automatically discriminate between fabric swatches 232 and background fabric 238 for fabric swatch array 230 and to automatically calculate a region of interest.

For example, analysis computer 40 may be configured to identify the boundaries of each of fabric swatches 232. After identifying the boundaries of one of fabric swatches 232, e.g., fabric swatch 232A, analysis computer 40 may calculate a coordinate system respective to that swatch. For fabric swatch 232A, for example, analysis computer 40 calculates x-axis 234A and y-axis 236A. Analysis computer 40 may be configured such that the intersection of the x-axis and the y-axis is located at the center of the fabric swatch. In the example of FIG. 8, analysis computer 40 calculates x-axis 234A and y-axis 236A such that their intersection (the origin of the coordinate system formed by x-axis 234A and y-axis 236A) is located at the center of fabric swatch 232.

After calculating the coordinate system, analysis computer 40 may calculate a region of interest centered at the intersection of the x-axis and the y-axis. The region of interest may comprise the entire image of the respective one of fabric swatches 232, or only a portion thereof. After determining the region of interest, analysis computer 40 calculates a luminosity value for the region of interest, and correlates the luminosity value with a cleanliness value for the corresponding one of fabric swatches 232. Analysis computer 40 may apply these techniques to each of fabric swatches 232 to calculate individual cleanliness values for each of fabric swatches 232. Moreover, in some examples, analysis computer 40 may calculate an average cleanliness value for fabric swatch array 230 by calculating an average of the cleanliness values of each of fabric swatches 232.

In some examples, analysis computer 40 may calculate initial cleanliness values for each of fabric swatches 232 after fabric swatches 232 are soiled but before fabric swatches 232 are cleaned. After cleaning of fabric swatches 232, analysis computer 40 may recalculate cleanliness values for each of fabric swatches 232. In this manner, analysis computer 40 may assist a user in determining the efficacy of a laundering agent or other chemical agent, e.g., by demonstrating a change in the cleanliness value of a soiled fabric swatch after the fabric swatch has been cleaned by the chemical agent. Similar techniques to those discussed with respect to FIG. 9 may also be used to calculate cleanliness values for ceramic tiles.

Figure 10:
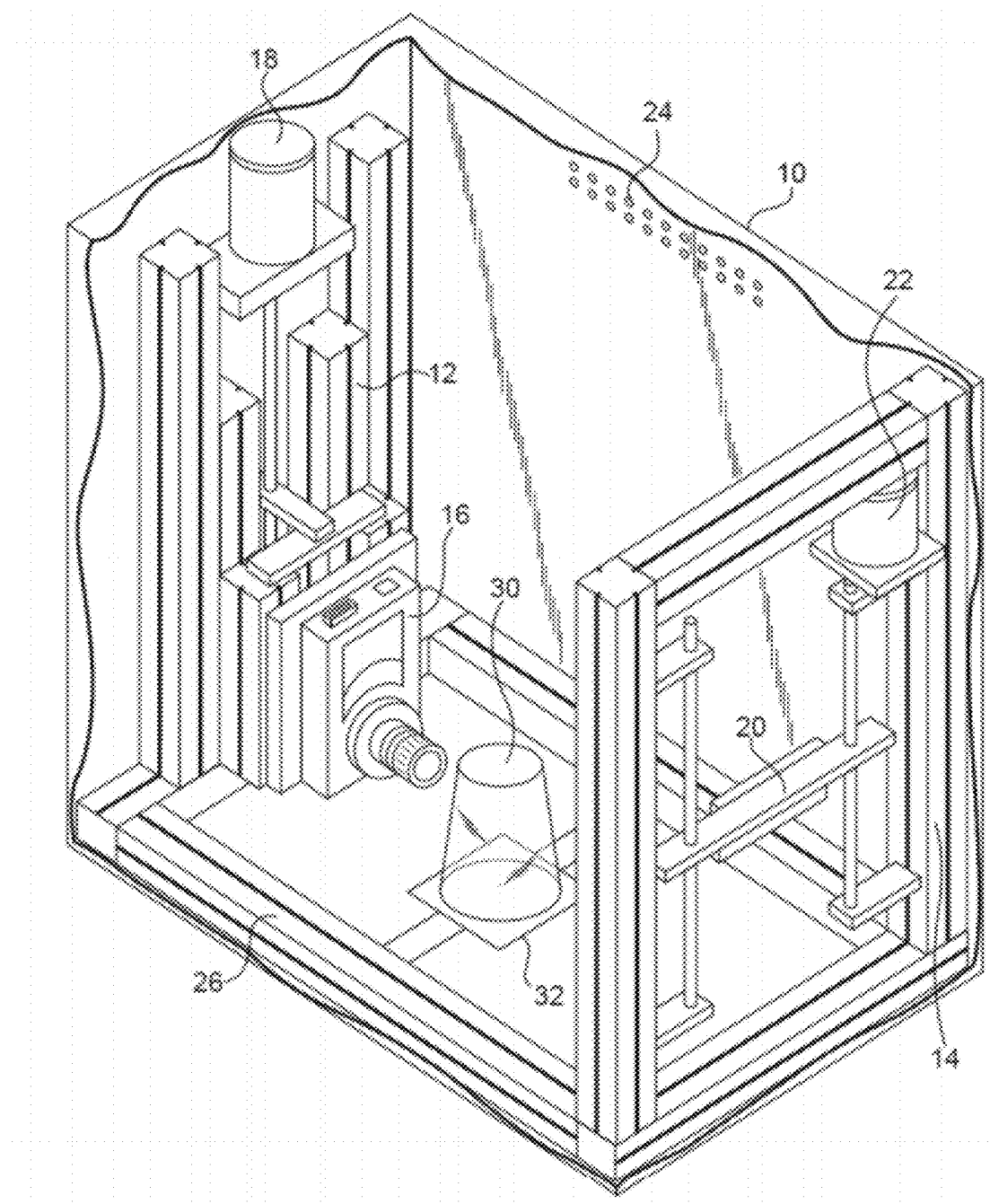
FIG. 10 is a perspective view of a system for capturing a digital image of a ware in an environment suited for capturing the digital image based on the type of ware to be analyzed.

FIG. 10 is a perspective view of an example system for capturing a digital image of a ware in an environment suited for capturing the digital image based on the type of ware to be analyzed. The components of FIG. 10 correspond to the similarly-labeled components of FIG. 1. The perspective view of FIG. 10 illustrates an example arrangement of certain components of FIG. 1. For example, the system of FIG. 10 includes camera 16, LED array 20, LED array 24 (corresponding to LED array 24B in FIG. 1), camera actuator 18, LED actuator 22, ware actuator 32, and housing 10. FIG. 10 illustrates a cut-away of housing 10 such that the components inside of housing 10 can be seen. However, as described with respect to FIG. 1, housing 10 generally provides a light-tight environment for camera 16, LED arrays 20, 24, and ware 30.

The example system of FIG. 10 therefore comprises a camera to capture a digital image of a ware, a light source to illuminate the ware, a housing to enclose the ware, the camera, and the light source in a light-tight environment. Not illustrated in FIG. 10 is an analysis computer. However, an analysis computer may additionally be included to receive the digital image, calculate a luminosity value for the ware from the digital image, and determine a cleanliness value for the ware from the calculated luminosity value. The analysis computer may control camera 16, camera actuator 18, LED arrays 20, 24, LED actuator 22, and ware actuator 32, as described above. The analysis computer may, for example, cause camera 16 to capture an image of ware 30, retrieve the image, and analyze the image. In this manner, the analysis computer may perform a method comprising receiving a digital image of a ware, calculating a luminosity value for the ware from the digital image, and determining a cleanliness value for the ware from the calculated luminosity value.

Figure 11:
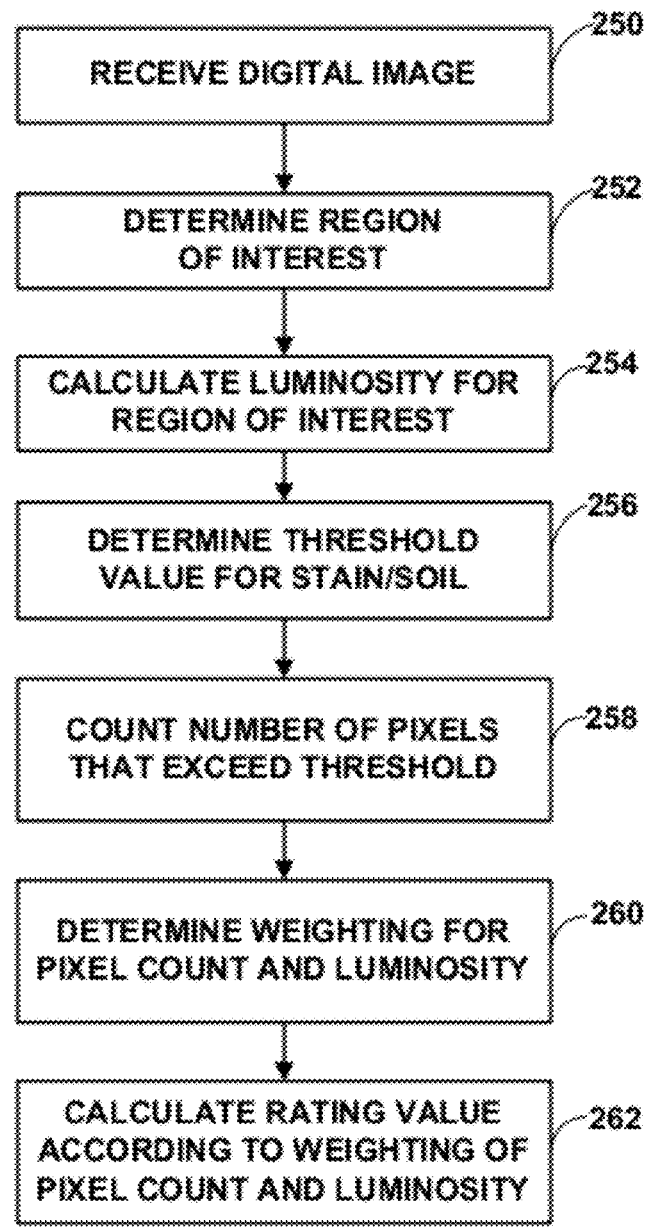
FIG. 11 is a flowchart illustrating an example method for calculating a rating value based on a combination of a luminosity value and a count of pixels within a particular range corresponding to known soiled/stained regions of a surface.

FIG. 11 is a flowchart illustrating an example method for calculating a rating value based on a combination of a luminosity value and a count of pixels within a particular range corresponding to known soiled/stained regions of a surface. Initially, analysis computer 40 receives a digital image of a surface (250), either by retrieving a digital image from a camera, such as camera 16, or by retrieving a pre-recorded digital image. Analysis computer 40 also determines a region of interest for the digital image (252). In some examples, analysis computer 40 may utilize the techniques described above, or other techniques, to dynamically determine the region of interest. In some examples, analysis computer 40 may receive a definition of the region of interest from a user. In some examples, analysis computer 40 may dynamically determine the region of interest and request a user to verify that the region of interest is correct before proceeding, also allowing the user to modify the dynamically determined region of interest. After determining the region of interest, analysis computer 40 calculates a luminosity value for the region of interest (254). Analysis computer 40 may, in some examples, use the method of FIG. 6 to calculate the luminosity value.

Analysis computer 40 also generally determines a number of pixels that exceed a particular threshold luminosity value, in the example of FIG. 11. In some examples, analysis computer 40 may be configured with a range of luminosity values, e.g., a minimum threshold luminosity value and a maximum threshold luminosity value. In some examples, analysis computer 40 may dynamically calculate the threshold value(s), while in other examples, analysis computer 40 may be configured with the threshold value(s). Although depicted in FIG. 11 as occurring in sequence following the calculation of the luminosity value, it should be understood that in some examples, the calculation of the number of pixels within the threshold value(s) may occur in parallel with the calculation of the luminosity value.

In particular, analysis computer 40 determines a threshold luminosity value corresponding to staining or soiling of the surface being analyzed (256). As discussed above, analysis computer 40 may either be configured with this value or may dynamically determine the value, e.g., from one or more control wares corresponding to the surface to be analyzed. Analysis computer 40 may then determine a number of pixels that exceed the threshold. In other examples, in which analysis computer 40 is configured with a minimum threshold and a maximum threshold, analysis computer 40 determines a number of pixels that fall within the minimum threshold and the maximum threshold. That is, in such examples, analysis computer 40 may determine a number of pixels for which a luminosity value exceeds a minimum threshold luminosity value and does not exceed a maximum threshold luminosity value.

Analysis computer 40 next determines a weighting value to apply to each of the calculated luminosity value and the number of pixels that exceed (or fall between) the threshold value(s) (260). The weighting value may comprise a percentage value w, e.g., a value between 0 and 1 inclusive, where the value w is applied to one of the two determined values (e.g., the luminosity value), and the difference between 1 and w is applied to the other (e.g., the number of pixels above/within the threshold value(s)). In this manner, analysis computer 40 may calculate a rating value by applying the weighting value to the luminosity value and the number of pixels above/within the threshold value(s) (262). For example, assuming that the luminosity value is L and the number of pixels above a threshold is N, and that the weighting value is w, analysis computer 40 may calculate the rating value R as:

$$R = w*N + (1-w)*L$$

In some examples, the rating value R may further be correlated with a cleanliness value. For example, as discussed above, various rating values may be determined for control clean wares and control stained wares to determine a correlation between rating values and cleanliness values. Then for an experimental surface of a ware corresponding to the same ware type as one of the control wares (that is, a surface with an unknown cleanliness value), analysis computer 40 may calculate a rating value and correlate the rating value with the cleanliness values to determine a cleanliness value for the experimental surface.

In other examples, rather than measuring an absolute number of pixels with luminosity values that exceed a threshold or are within a threshold, analysis computer 40 may determine a percentage of pixels in the region of interest for which luminosity values exceed or are within a threshold. Analysis computer 40 may then determine that the percentage is representative of a percentage of the surface that is stained or soiled.

Figure 12:
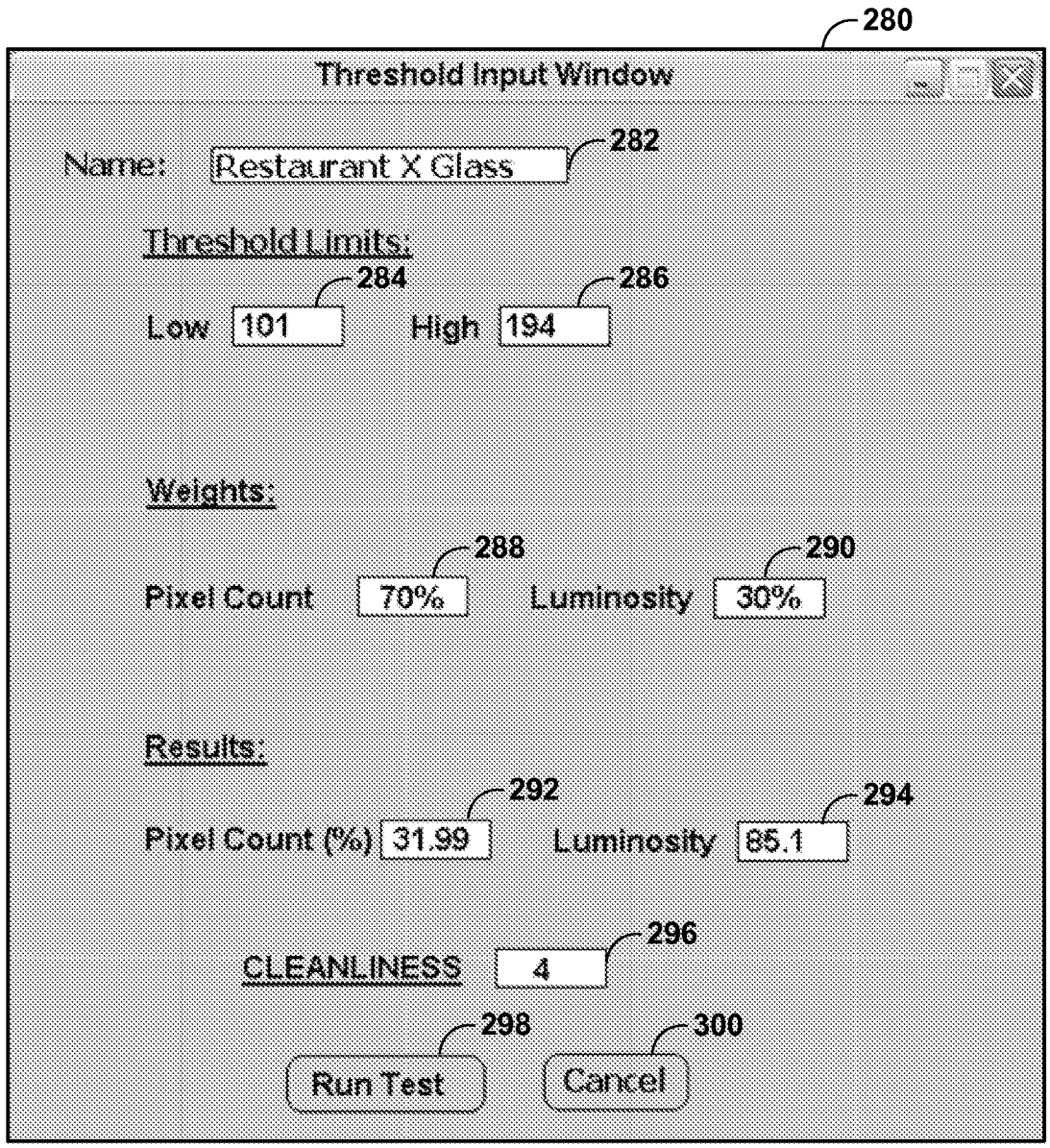
FIG. 12 is a screenshot illustrating an example graphical user interface for entering threshold luminosity values and calculating a cleanliness value.

FIG. 12 is a screenshot illustrating an example graphical user interface (GUI) 280 for entering threshold luminosity values and calculating a cleanliness value. In particular, GUI 280 includes low text field 284 and high text field 286 for setting a minimum luminosity threshold value and a maximum luminosity threshold value, respectively, corresponding to the ware identified by name text field 282. Analysis computer 40 may present GUI 280 to retrieve the minimum luminosity threshold value from the value entered in low text field 284 and the maximum luminosity threshold value from the value entered in high text field 286. In particular, a user may enter these values into the corresponding text fields, and analysis computer 40 may retrieve the values when the user selects "Run Test" button 298. Analysis computer 40 may count a pixel (e.g., corresponding to step 258 in FIG. 11) when a luminosity value for the pixel is between the minimum luminosity threshold value and the maximum luminosity threshold value.

In the example of FIG. 12, the minimum luminosity threshold value is "101" and the maximum luminosity threshold value is "194." Therefore, analysis computer 40 may count pixels with luminosity values between 101 and 194, in this example. In this example, analysis computer 40 has calculated that 31.99% of the pixels in the region of interest have a luminosity value between 101 and 194, as shown in Pixel Count text box 292. Analysis computer 40 may also calculate a luminosity value for the region of interest. In the example of FIG. 12, analysis computer 40 has calculated a luminosity value for the surface of 85.1, as shown in luminosity value text box 294.

Analysis computer 40 may further retrieve weighting values for each of the pixel count value and the luminosity value. In the example of FIG. 12, analysis computer 40 retrieves the weighting values from pixel count weight text box 288 and luminosity weight text box 290. As discussed with respect to FIG. 11, analysis computer 40 may apply the pixel count weight to the pixel count value and the luminosity weight to the luminosity value to calculate a result value (not shown). Analysis computer 40 may then correlate the result value with known cleanliness values to determine a cleanliness value for the surface being analyzed. In the example of FIG. 12, analysis computer 40 has determined that the cleanliness value is a "4," as shown in cleanliness value text box 296.

In general, analysis computer 40 may retrieve values from low text box 284, high text box 286, pixel count weight text box 288, and luminosity weight text box 290 when a user selects "Run Test" button 298. Analysis computer 40 may also, in accordance with the method of FIG. 11, evaluate the pixel count and luminosity for a surface (in particular, a region of interest of the surface) according to the retrieved values. The user may also select "Cancel" button 300 to close GUI 280.

Various techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

Instructions to perform certain techniques described in this disclosure may also be embodied or encoded in a computer-readable medium, such as a computer-readable storage medium. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. A method comprising:
receiving, with a computing device, an identification of a ware type corresponding to a surface;
automatically configuring, with the computing device, an environment in which to capture a digital image of the surface based on the identification of the ware type;
receiving, with the computing device, the digital image of a surface;
calculating a luminosity value for the surface from the digital image; and
determining, with the computing device, a cleanliness value for the surface from the calculated luminosity value.

2. A method comprising:
automatically configuring, based on a ware type identification, an environment in which to capture a digital image of at least a portion of a surface corresponding to the ware type identification;

analyzing, with a computing device, the digital image and calculating a luminosity value for the at least a portion of the surface based on the analysis; and determining, with the computing device, a cleanliness value for the at least a portion of the surface based on the calculated luminosity value.

3. The method of claim 1, wherein the environment comprises at least one of a lighting arrangement, a lighting position relative to the surface, a housing, an internal coloring of the housing, a camera position relative to the surface, a camera aperture, and a camera shutter speed.

4. The method of claim 3,
wherein receiving the identification of the ware type comprises receiving an identification that the ware type comprises one of a drinking glass, a plate, and a stainless steel coupon, and
wherein automatically configuring the environment comprises positioning an array of light-emitting diodes (LEDs) such that light emitted by the LEDs of the array is aimed at the surface.

5. The method of claim 3,
wherein receiving the identification of the ware type comprises receiving an identification that the ware type comprises one of a fabric swatch array and a ceramic tile, and
wherein automatically configuring the environment comprises enabling an array of light-emitting diodes (LEDs) configured to provide diffused lighting to illuminate the surface.

6. The method of claim 1 wherein receiving a digital image of a surface includes receiving the digital image of the surface from a camera that captures the digital image of the surface.

7. The method of claim 1, wherein calculating the luminosity value for the surface comprises:
calculating a histogram from luminosity values of pixels of the digital image, wherein the histogram comprises a plurality of bins corresponding to a range of the luminosity values, and wherein each bin of the histogram comprises a bin index and a bin value representative of a number of pixels in the digital image that have the luminosity value corresponding to the bin index; and
calculating an average luminosity value from the histogram.

8. The method of claim 1, wherein determining a cleanliness value comprises correlating the calculated luminosity value to predetermined cleanliness values.

9. The method of claim 8, wherein the predetermined cleanliness values correspond to known cleanliness values for control surfaces of a same ware type as the received identification of the ware type.

10. The method of claim 1, further comprising:
determining a threshold luminosity value; and
counting a number of pixels in the digital image for which corresponding luminosity values exceed the threshold luminosity value,
wherein determining the cleanliness value further comprises determining the cleanliness value from the luminosity value for the surface and the counted number of pixels.

11. A system comprising:
a camera to capture a digital image of a surface;
a light source to illuminate the surface;
a housing to enclose the surface, the camera, and the light source in a light-tight environment; and
an analysis computer to receive a ware type identification corresponding to the surface, configure an environment within the housing in which to capture the digital image based on the ware type, receive the digital image, analyze the digital image and calculate a luminosity value for the surface based on the analysis, and determine a cleanliness value for the surface based on the calculated luminosity value.

12. The system of claim 11, wherein the analysis computer is configured to automatically enable the light source and to control the camera to capture the digital image.

13. The system of claim 11, further comprising a light source actuator coupled to the light source to control an angle of the light source with respect to the surface.

14. The system of claim 11, further comprising a camera actuator coupled to the camera and to control a height of the camera with respect to the surface.

15. The system of claim 11, wherein the surface corresponds to a stainless steel coupon, and wherein the housing comprises an interior color of white.

16. The system of claim 11, wherein the surface corresponds to a drinking glass, and wherein the housing comprises an interior color of black.

17. The system of claim 11, wherein the surface corresponds to one of a fabric swatch array or a ceramic tile, and wherein the housing comprises an interior color of black.

18. The system of claim 11, wherein the surface corresponds to a dish, wherein the housing comprises an interior color of black.

19. The system of claim of claim 11, wherein the analysis computer is configured to calculate the luminosity value for the digital image by calculating a histogram from luminosity values of pixels of the digital image, wherein the histogram comprises a plurality of bins corresponding to a range of the luminosity values, and wherein each bin of the histogram comprises a bin index and a bin value representative of a number of pixels in the digital image that have the luminosity value corresponding to the bin index, and calculating an average luminosity value from the histogram.

20. The system of claim 11, wherein the analysis computer is configured to determine the cleanliness value by correlating the calculated luminosity value to predetermined cleanliness values, wherein the predetermined cleanliness values correspond to known cleanliness values for control wares of the same ware type as the ware type corresponding to the surface depicted in the digital image.

21. The system of claim 11, wherein the light source comprises a direct-lighting array of light-emitting diodes (LEDs) and a diffused-lighting array of LEDs.

22. The system of claim 21, wherein the analysis computer enables the direct-lighting array of LEDs when a ware corresponding to the surface comprises one of a drinking glass, a stainless steel coupon, or a dish.

23. The system of claim 21, wherein the analysis computer enables the diffused-lighting array of LEDs when a ware corresponding to the surface comprises one of a fabric swatch array or a ceramic tile.

24. The system of claim 11, further comprising a washing apparatus to wash the surface, wherein the analysis computer is configured to automatically disable the washing apparatus when the analysis computer determines that the surface has achieved a cleanliness value that exceeds a threshold.

25. A non-transitory computer-readable medium encoded with instructions for causing a programmable processor to:
receive an identification of a ware type corresponding to the surface;
automatically configure an environment in which to capture the digital image of the surface based on the identification of the ware type;
receive a digital image of a surface;

calculate a luminosity value for the surface from the digital image; and determine a cleanliness value for the surface from the calculated intensity value.

26. The non-transitory computer-readable medium of claim 25, further encoded with instructions to automatically configure an environment in which to capture the digital image of the surface based on the identification of the ware type, wherein the environment comprises at least one of a lighting arrangement, a lighting position relative to the surface, a housing, an internal coloring of the housing, a camera position relative to the surface, a camera aperture, and a camera shutter speed.

27. The non-transitory computer-readable medium of claim 26, wherein the instructions to receive the identification comprise instructions to receive an identification that the ware type comprises one of a drinking glass, a plate, and a stainless steel coupon, and wherein the instructions to automatically configure an environment comprise instructions to position an array of light-emitting diodes (LEDs) such that light emitted by the LEDs of the array is aimed at the surface.

28. The non-transitory computer-readable medium of claim 26, wherein the instructions to receive the identification comprise instructions to receive an identification that the ware type comprises one of a fabric swatch array and a ceramic tile, and wherein the instructions to automatically configure an environment comprise instructions to configure an array of light-emitting diodes (LEDs) configured to provide diffused lighting to illuminate the surface.

29. The non-transitory computer-readable medium of claim 25, further encoded with instructions to control a camera that captures the digital image of the surface.

30. The non-transitory computer-readable medium of claim 25, wherein the instructions to calculate a luminosity value for the surface comprise instructions to:

calculate a histogram from luminosity values of pixels of the digital image, wherein the histogram comprises a plurality of bins corresponding to a range of the luminosity values, and wherein each bin of the histogram comprises a bin index and a bin value representative of a number of pixels in the digital image that have the luminosity value corresponding to the bin index; and calculate an average luminosity value from the histogram.

31. The non-transitory computer-readable medium of claim 25, wherein the surface corresponds to a ware type, wherein the instructions to determine a cleanliness value comprise instructions to correlate the calculated luminosity value with predetermined cleanliness values, wherein the predetermined cleanliness values correspond to known cleanliness values for control wares of the same ware type as the ware type corresponding to the surface depicted in the digital image.

* * * * *